US012781672B2

(12) United States Patent
Gravina et al.

(10) Patent No.: US 12,781,672 B2
(45) Date of Patent: Nov. 3, 2026

(54) TURBINE ENGINE GEARBOX ASSEMBLY

(71) Applicants: GE Avio S.r.l., Rivalta di Torino (IT); GE Aviation Czech s.r.o., Prague (CZ)

(72) Inventors: Michele Gravina, Milan (IT); Juraj Hrubec, Prague (CZ)

(73) Assignees: GE AVIO S.R.L., Rivalta di Torino (IT); GE AVIATION CZECH S.R.O., Prague (CZ)

( * ) Notice: Subject to any disclaimer, the term of this patent is extended or adjusted under 35 U.S.C. 154(b) by 0 days.

(21) Appl. No.: 19/170,780

(22) Filed: Apr. 4, 2025

(65) Prior Publication Data

US 2025/0314207 A1 Oct. 9, 2025

(30) Foreign Application Priority Data

Apr. 4, 2024 (IT) ........................ 102024000007375

(51) Int. Cl.
*F16H 57/02* (2012.01)
*F02C 7/36* (2006.01)

(52) U.S. Cl.
CPC ............... *F02C 7/36* (2013.01); *F16H 57/02* (2013.01); *F05D 2260/40311* (2013.01); *F16H 2057/02039* (2013.01)

(58) Field of Classification Search
CPC ... F05D 2260/40311; F16H 57/02; F02C 7/36
See application file for complete search history.

(56) References Cited

U.S. PATENT DOCUMENTS

| | | | | |
|---|---|---|---|---|
| 2,616,308 | A | 11/1952 | Burnett | |
| 5,540,630 | A | 7/1996 | Vranish | |
| 7,874,953 | B2 | 1/2011 | Shamie et al. | |
| 10,378,643 | B2 | 8/2019 | Cintula | |
| 10,823,260 | B2 * | 11/2020 | Gravina | F16H 57/08 |

(Continued)

FOREIGN PATENT DOCUMENTS

| | | | |
|---|---|---|---|
| FR | 3127024 | A1 | 3/2023 |
| FR | 3127025 | A1 | 3/2023 |

(Continued)

OTHER PUBLICATIONS

Anderson, et al., "Advanced Gearbox Technology Final Report," Allison Gas Turbine Division, General Motors Corporation, NASA Lewis Research Center, Jun. 1987.

(Continued)

*Primary Examiner* — Derek D Knight
(74) *Attorney, Agent, or Firm* — Venable LLP; Peter T. Hrubiec; Michele V. Frank

(57) ABSTRACT

A turbine engine having a turbo-engine coupled to an input shaft, a fan coupled to an output shaft, and a gearbox assembly. A torque is transferrable from the input shaft to the output shaft through the gearbox assembly. The gearbox assembly has a split sun gear rotationally coupled to the input shaft, a plurality of planet gears located radially outward of, and intermeshing with, the split sun gear, and a single piece ring gear located radially outward of, and intermeshing with, the plurality of planet gears. The split sun gear includes a forward sun gear and an aft sun gear separate from the forward sun gear, and the forward sun gear and the aft sun gear are each rotationally coupled to the input shaft.

19 Claims, 14 Drawing Sheets

(56) References Cited

U.S. PATENT DOCUMENTS

| | | | | |
|---|---|---|---|---|
| 10,890,247 | B2 * | 1/2021 | Gravina | F16H 57/0456 |
| 11,187,303 | B1 | 11/2021 | Elmore et al. | |
| 11,377,199 | B2 | 7/2022 | Mitrovic | |
| 11,454,314 | B2 | 9/2022 | Zhang | |
| 11,542,829 | B2 | 1/2023 | Facchini et al. | |
| 11,674,592 | B2 * | 6/2023 | Mouly | F16H 57/082<br>475/331 |
| 2012/0225748 | A1 | 9/2012 | Michel et al. | |
| 2019/0113127 | A1 | 4/2019 | Gravina | |

FOREIGN PATENT DOCUMENTS

| | | | |
|---|---|---|---|
| FR | 3129436 | A1 | 5/2023 |
| FR | 3129690 | A1 | 6/2023 |
| FR | 3130747 | A1 | 6/2023 |
| FR | 3130875 | A1 | 6/2023 |

OTHER PUBLICATIONS

Jay Bennett, “Rolls-Royce Sets Record for Most Powerful Turbofan Gearbox In the World,” Popular Mechanics, published Sep. 6, 2017, https://www.popularmechanics.com/flight/news/a28082/rolls-royce-record-most-powerful-turbofan-gearbox-aircraft-engine/, as viewed on Feb. 28, 2024.

* cited by examiner

TURBINE ENGINE GEARBOX ASSEMBLY

CROSS REFERENCE TO RELATED APPLICATIONS

The present application claims the benefit of Italian Patent Application No. 102024000007375, filed on Apr. 4, 2024, which is hereby incorporated by reference herein in its entirety.

TECHNICAL FIELD

The present disclosure relates generally to a gearbox assembly, for example, for turbine engines.

BACKGROUND

Turbine engines generally include a fan and a core section arranged in flow communication with one another. A gearbox assembly is coupled between the fan and the core section.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Figure 1:
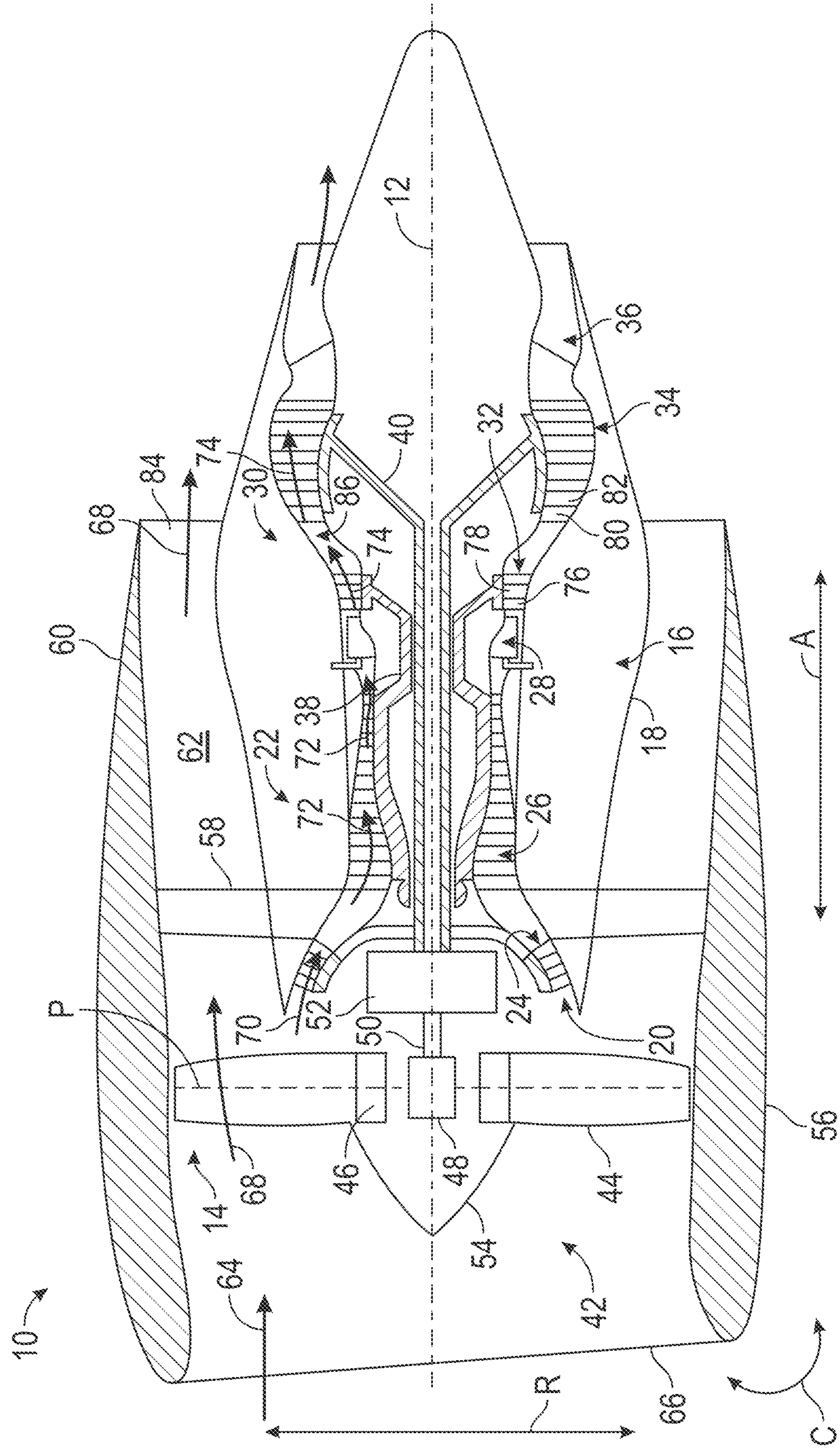
FIG. 1 illustrates a schematic cross-sectional view of a turbine engine, taken along a longitudinal centerline axis of the engine, according to the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the present disclosure.

As used herein, the terms “first” and “second,” and the like, may be used interchangeably to distinguish one component from another and are not intended to signify location or importance of the individual components.

The terms “upstream” and “downstream” refer to the relative direction with respect to fluid flow in a fluid pathway. For example, “upstream” refers to the direction from which the fluid flows, and “downstream” refers to the direction to which the fluid flows.

The terms “forward” and “aft” refer to relative positions within a turbine engine or a vehicle, and refer to the normal operational attitude of the turbine engine or the vehicle. For example, with regard to a turbine engine, forward refers to a position closer to an engine inlet and aft refers to a position closer to an engine nozzle or an exhaust.

As used herein, the terms “low,” “mid” (or “mid-level”), and “high,” or their respective comparative degrees (e.g., “lower” and “higher”, where applicable), when used with compressor, turbine, shaft, fan, or turbine engine components, each refers to relative pressures, relative speeds, relative temperatures, and/or relative power outputs within an engine unless otherwise specified. For example, a “low power” setting defines the engine configured to operate at a power output lower than a “high power” setting of the engine, and a “mid-level power” setting defines the engine configured to operate at a power output higher than a “low power” setting and lower than a “high power” setting. The terms “low,” “mid” (or “mid-level”), or “high” in such aforementioned terms may additionally, or alternatively, be understood as relative to minimum allowable speeds, pressures, or temperatures, or minimum or maximum allowable speeds, pressures, or temperatures relative to normal, desired, steady state, etc., operation of the engine.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein. The terms include integral and unitary configurations (e.g., blisk rotor blade systems).

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

Here and throughout the specification and claims, range limitations are combined, and interchanged. Such ranges are identified and include all the sub-ranges contained therein unless context or language indicates otherwise. For example, all ranges disclosed herein are inclusive of the endpoints, and the endpoints are independently combinable with each other.

The present disclosure provides a gearbox assembly comprising a sun gear, a plurality of planet gears, and an annular ring gear for use in an indirect drive turbine engine. The gear train of the gearbox assembly is composed of double helical gears. The double helical gears include two rows of helical teeth that are of opposing helix angles. For example, the sun gear, each of the plurality of planet gears, and the annular ring gear each comprise a double helical gear having gear teeth that mesh with the gear teeth of the adjacent double helical gear, as described in more detail to follow. To achieve assembly of a geartrain having double helical gears, the ring gear may be formed by joining two separate pieces during assembly.

The present disclosure provides a double helical gear with a single piece/unitary ring gear (e.g., not a split ring gear) by providing a split sun gear. The split sun gear in conjunction with the single piece ring gear provides for a small radial envelope for the gearbox assembly (as compared to examples with a split ring gear). The small radial envelope lowers the gearbox weight and provides for a lower profile and thus more performant flow path, which provides for enhanced performance and a lower fuel burn of the turbine engine, as compared to gearboxes with a split ring gear.

In the examples of the present disclosure, the sun gear is a split sun gear such that the sun gear is formed of two separate pieces that are coupled to the input shaft and that may be, in some examples, coupled to each other. The split sun gear may be rotationally coupled to the input shaft with a spline coupling. In some examples, the two separate pieces of the sun gear may be coupled to each other with a curvic coupling. The present disclosure provides for examples of a split sun gear in conjunction with a single piece ring gear. The present disclosure provides for a gearbox assembly that prevents relative axial sliding of the two meshing gears (e.g., by preventing relative axial sliding of the sun gear).

A single piece ring gear allows for a reduced radial envelope by eliminating a bolted connection between two separate pieces of a single piece ring gear. With a single piece ring gear, the sun gear shall then be split into two separate pieces. The combination of a split sun gear and a single piece ring gear allows for a lower radial envelope, easy packaging in the sump, flow path optimization (e.g., due to a low profile gearbox assembly), enhanced efficiency, and a lower weight with a higher reliability, as compared to a gearbox assembly having a split ring gear. A single piece ring gear also allows for a more flexible construction (as compared to a split, bolted ring gear) since there is no limitation to radial deflection that would normally be associated with a split, bolted ring gear. (In a split ring gear, radial deflections are controlled and minimized to mitigate risk of fretting at the bolted connection.) The more flexible construction, therefore, allows for a more uniform load share among the plurality of planet gears, which, in turn, provides a higher power density of the gearbox assembly.

Referring now to the drawings, FIG. 1 is a schematic cross-sectional view of a turbine engine 10, taken along a longitudinal centerline axis 12 of the turbine engine 10, according to an embodiment of the present disclosure. As shown in FIG. 1, the turbine engine 10 defines an axial direction A (extending parallel to the longitudinal centerline axis 12 provided for reference), a radial direction R that is normal to the axial direction A, and a circumferential direction C extending about the longitudinal centerline axis 12. In general, the turbine engine 10 includes a fan section 14 and a turbo-engine 16 disposed downstream from the fan section 14.

The turbo-engine 16 includes, in serial flow relationship, a compressor section 22, a combustion section 28, and a turbine section 30. The turbo-engine 16 is substantially enclosed within an outer casing 18 that is substantially tubular and defines an annular inlet 20. As schematically shown in FIG. 1, the compressor section 22 includes a booster or a low-pressure (LP) compressor 24 followed downstream by a high-pressure (HP) compressor 26, the combustion section 28 is downstream of the compressor section 22, and the turbine section 30 is downstream of the combustion section 28 and includes a high-pressure (HP) turbine 32 followed downstream by a low-pressure (LP) turbine 34. The turbo-engine 16 further includes a core exhaust nozzle section 36 that is downstream of the turbine section 30, a high-pressure (HP) shaft 38 or a spool, and a low-pressure (LP) shaft 40. The HP shaft 38 drivingly connects the HP turbine 32 to the HP compressor 26 to rotate in unison. The LP shaft 40 drivingly connects the LP turbine 34 to the LP compressor 24 to rotate the LP turbine 34 to the LP compressor 24. Rotation of the LP shaft 40 causes the LP turbine 34 and the LP compressor 24 to rotate in unison.

For the embodiment depicted in FIG. 1, the fan section 14 includes a fan 42 (e.g., a variable pitch fan) having a plurality of fan blades 44 coupled to a disk 46 in a spaced apart manner. As depicted in FIG. 1, the fan blades 44 extend outwardly from the disk 46 generally along the radial direction R. Each fan blade 44 is rotatable relative to the disk 46 about a pitch axis P by virtue of the fan blades 44 being operatively coupled to an actuation member 48 configured to collectively vary the pitch of the fan blades 44 in unison. The fan blades 44, the disk 46, and the actuation member 48 are together rotatable about the longitudinal centerline axis 12 via a fan shaft 50 that is powered by the LP shaft 40 across a power gearbox, also referred to as a gearbox assembly 52. The gearbox assembly 52 is shown schematically in FIG. 1. The gearbox assembly 52 includes a plurality of gears for adjusting the rotational speed of the fan shaft 50 and, thus, the fan 42 relative to the LP shaft 40.

Referring still to the exemplary embodiment of FIG. 1, the disk 46 is covered by a rotatable fan hub 54 aerodynamically contoured to promote an airflow through the plurality of fan blades 44. In addition, the fan section 14 includes an annular fan casing or a nacelle 56 that circumferentially surrounds the fan 42 and at least a portion of the turbo-engine 16. The nacelle 56 is supported relative to the turbo-engine 16 by a plurality of circumferentially spaced outlet guide vanes 58. Moreover, a downstream section 60 of the nacelle 56 extends over an outer portion of the turbo-engine 16 to define a bypass airflow passage 62 therebetween.

During operation of the turbine engine 10, a volume of air 64 enters the turbine engine 10 through an inlet 66 of the nacelle 56 or the fan section 14. As the volume of air 64 passes across the fan blades 44, a first portion of air 68 is directed or routed into the bypass airflow passage 62, and a second portion of air 70 is directed or is routed into the upstream section of the core air flow path, or, more specifically, into the annular inlet 20 of the LP compressor 24. The ratio between the first portion of air 68 and the second portion of air 70 is commonly known as a bypass ratio. The pressure of the second portion of air 70 is then increased, generating compressed air 72, and the compressed air 72 is routed through the HP compressor 26 and into the combustion section 28. The combustor of the combustion section 28 is positioned in the core air flow path where the compressed air 72 is mixed with a fuel flow and ignited to generate combustion gases 74. As described in more detail to follow, the fuel flow may be a primary fuel flow provided to the combustor.

The combustion gases 74 are routed into the HP turbine 32 and expanded through the HP turbine 32 where a portion of thermal energy and kinetic energy from the combustion gases 74 is extracted via sequential stages of HP turbine stator vanes 76 that are coupled to the outer casing 18 and HP turbine rotor blades 78 that are coupled to the HP shaft 38, thus, causing the HP shaft 38 to rotate, thereby supporting operation of the HP compressor 26 (self-sustaining cycle). In this way, the combustion gases 74 do work on the HP turbine 32. The combustion gases 74 are then routed into the LP turbine 34 and expanded through the LP turbine 34. Here, a second portion of thermal energy and the kinetic energy is extracted from the combustion gases 74 via sequential stages of LP turbine stator vanes 80 that are coupled to the outer casing 18 and LP turbine rotor blades 82 that are coupled to the LP shaft 40, thus, causing the LP shaft 40 to rotate, thereby supporting operation of the LP compressor 24 (self-sustaining cycle) and rotation of the fan 42 via the gearbox assembly 52. In this way, the combustion gases 74 do work on the LP turbine 34. One or more stages may be used in each of the HP turbine 32 and the LP turbine 34.

The combustion gases 74 are subsequently routed through the jet exhaust nozzle section 36 of the turbo-engine 16 to provide propulsive thrust. Simultaneously, the pressure of the first portion of air 68 is substantially increased as the first portion of air 68 is routed through the bypass airflow passage 62 before being exhausted from a fan nozzle exhaust section 84 of the turbine engine 10, also providing propulsive thrust. The HP turbine 32, the LP turbine 34, and the jet exhaust nozzle section 36 at least partially define a hot gas path 86 for routing the combustion gases 74 through the turbo-engine 16.

Figure 2:
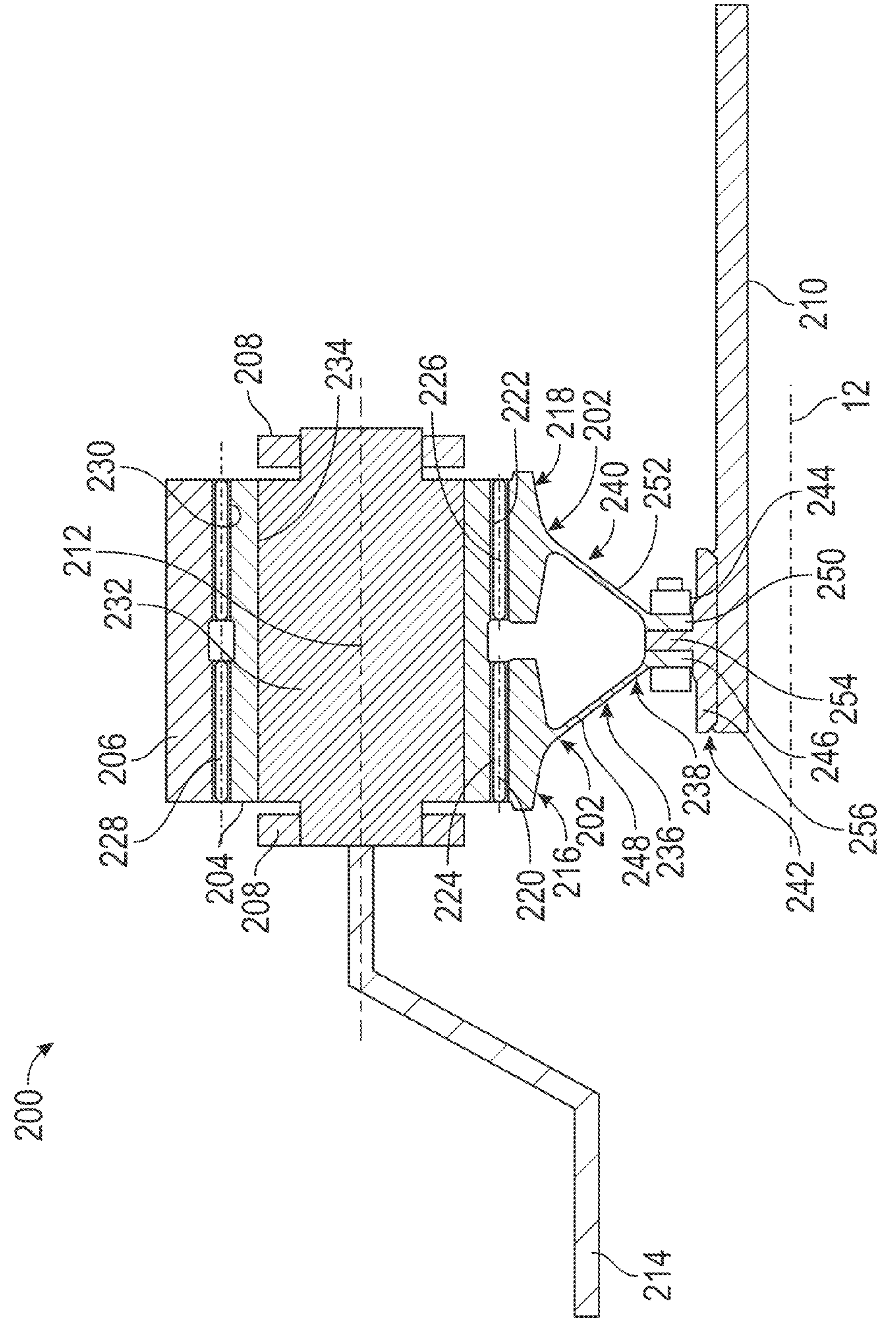
FIG. 2 illustrates a schematic cross-sectional view of a gearbox assembly for a turbine engine, taken along a longitudinal centerline axis of the gearbox assembly, according to the present disclosure.

FIG. 2 is a schematic, cross-sectional side view of a gearbox assembly 200, which may be employed as the gearbox assembly 52 of FIG. 1, according to an embodiment of the present disclosure. The gearbox assembly 200 includes a sun gear 202, a plurality of planet gears 204 (only one of which is visible in FIG. 2), and a ring gear 206. The sun gear 202 is also referred to herein as a split sun gear 202. That is, the sun gear 202 is formed of two separate components (e.g., a forward sun gear 216 and an aft sun gear 218) that have a connection device 236 to couple the two separate components together and to couple the sun gear 202 to the input shaft 210 with the connection device 236. For clarity, only a portion of the gears is shown.

The gearbox assembly 200 is a planetary type of gearbox assembly. That is, the ring gear 206 is held fixed, with a planet carrier 208 allowed to rotate. In such an arrangement, the fan 42 (FIG. 1) is driven by the planet carrier 208. In this way, the plurality of planet gears 204 are the output of the gearbox assembly 200. However, other suitable types of gearbox assemblies may be employed. For example, the gearbox assembly 200 may be a star type or a rotating ring gear type gearbox assembly (e.g., the ring gear 206 is rotating and the planet carrier 208 is fixed and stationary). In such an arrangement, the fan 42 (FIG. 1) is driven by the ring gear 206. In this way, the ring gear 206 is an output of the gearbox assembly 200. In another non-limiting embodiment, the gearbox assembly 200 may be a differential gearbox in which the ring gear 206 and the planet carrier 208 are both allowed to rotate.

The gearbox assembly 200 includes a gear train that is composed of double helical gears. The double helical gears include two rows of helical teeth that are of opposing helix angles. That is, the sun gear 202, each of the plurality of planet gears 204, and the annular ring gear 206 each comprise a double helical gear having gear teeth that mesh with the gear teeth of the adjacent double helical gear, as described in more detail to follow.

An input shaft 210 is coupled to the sun gear 202. The input shaft 210 is coupled to the turbine section 30 (FIG. 1). For example, the input shaft 210 can be coupled to the LP shaft 40 (FIG. 1). The input shaft 210 rotates the sun gear 202. Radially outward of the sun gear 202, and intermeshing therewith, is the plurality of planet gears 204 that are coupled together and supported by the planet carrier 208. The planet carrier 208 supports and constrains the plurality of planet gears 204 such that the plurality of planet gears 204 do not together rotate around the sun gear 202 while enabling each planet gear 204 of the plurality of planet gears 204 to rotate about its own axis 212. Radially outwardly of the plurality of planet gears 204, and intermeshing therewith, is the ring gear 206, which is an annular ring gear. The ring gear 206 is a single piece ring gear. As used herein, "single piece" refers to a single, integral, and unitary component formed of only a single component with no bolted connection in the geared portion of the ring gear, though a bolted connection may be present in a connecting member coupling the ring gear to a static structure, such as the engine frame. The planet carrier 208 is coupled via an output shaft 214 to the fan 42 (FIG. 1) and rotates to drive rotation of the fan 42 (FIG. 1) about the longitudinal centerline axis 12. For example, the output shaft 214 is coupled to the fan shaft 50 (FIG. 1).

As noted above, the sun gear 202 includes the forward sun gear 216 and the aft sun gear 218. Each of the sun gear 202, the plurality of planet gears 204, and the ring gear 206 comprises teeth about their periphery to intermesh with the other gears. In particular, the forward sun gear 216 of the sun gear 202 comprises a first set of sun gear teeth 220 and the aft sun gear 218 of the sun gear 202 comprises a second set of sun gear teeth 222. As discussed above, the sun gear 202 is a bi-helical or double helical gear such that each of the first set of sun gear teeth 220 and the second set of sun gear teeth 222 are helical teeth angled relative to each other. Each of the plurality of planet gears 204 includes a first set of planet gear teeth 224 and a second set of planet gear teeth 226. As discussed above, each of the planet gears 204 is a bi-helical or double helical gear such that each of the first set of planet gear teeth 224 and the second set of planet gear teeth 226 are helical teeth. The ring gear 206 includes a first set of ring gear teeth 228 and a second set of ring gear teeth 230. As discussed above, the ring gear 206 is a bi-helical or double helical gear such that each of the first set of ring gear teeth 228 and the second set of ring gear teeth 230 are helical teeth.

In the gearbox assembly 200 of FIG. 2, the first set of sun gear teeth 220 of the forward sun gear 216 mesh with the first set of planet gear teeth 224 of each of the planet gears 204 and the second set of sun gear teeth 222 of the aft sun gear 218 mesh with the second set of planet gear teeth 226 of each of the planet gears. Likewise, the first set of planet gear teeth 224 and the second set of planet gear teeth 226 of each of the planet gears 204 meshes with the first set of ring gear teeth 228 and the second set of ring gear teeth 230 of the ring gear 206, respectively.

Each of the planet gears 204 includes a pin 232 about which a respective planet gear 204 rotates. The pin 232 is coupled to the planet carrier 208 and is disposed within a bore 234 of a respective planet gear 204. Lubricant (e.g., oil) is provided between the pin 232 and a respective planet gear 204 such that the planet gear 204 rotates with respect to the pin 232. The pin 232 is illustrated as a single component for simplicity, but may be a sub-assembly that includes one or more of a pin, rolling elements (e.g., a journal or bearings), and retaining features.

As noted above, the connection device 236 couples the split sun gear 202 to the input shaft 210. The connection device 236 includes a forward support member 238, an aft support member 240, an input shaft coupling member 242, and a fastening device 244.

The forward support member 238 includes a first portion 246 and a second portion 248. The first portion 246 extends in the radial direction and includes an opening therethrough (not visible) for receiving the fastening device 244. The second portion 248 extends at an angle between the first portion 246 and the forward sun gear 216.

The aft support member 240 includes a first portion 250 and a second portion 252. The first portion 250 extends in the radial direction and includes an opening therethrough (not visible) for receiving the fastening device 244. The second portion 252 extends at an angle between the first portion 250 and the aft sun gear 218.

The input shaft coupling member 242 includes a first portion 254 and a second portion 256. The first portion 254 extends in the radial direction between and parallel to the first portion 246 of the forward support member 238 and the first portion 250 of the aft support member 240. The first portion 254 includes an opening therethrough (not visible) for receiving the fastening device 244. The second portion 256 extends in an axial direction parallel to the input shaft 210 and parallel to the longitudinal centerline axis 12 (FIG. 1). The second portion 256 is rotationally coupled to the input shaft 210 such that rotation of the input shaft 210 causes rotation of the second portion 256 and, therefore, rotation of the sun gear 202. In the example of FIG. 2, the second portion 256 is rotationally coupled to the input shaft 210 with a spline, such as described in more detail with respect to FIGS. 3A and 3B.

The fastening device 244 extends through respective openings in the first portion 246 of the forward support member 238, the first portion 250 of the aft support member 240, and the first portion 254 of the input shaft coupling member 242. The fastening device 244 is secured within the openings such that the forward support member 238, the aft support member 240, and the input shaft coupling member 242 are fixedly attached together. In this manner, the forward sun gear 216 and the aft sun gear 218 are rotationally coupled to the input shaft 210 by way of the connection device 236. As described herein, the fastening device 244 may be a bolt, screw, weld, anchor, river, or other mechanical fastener.

The illustration of FIG. 2 is a cross-sectional view taken along the longitudinal centerline axis 12 of the turbine engine 10 of FIG. 1, with half of the sun gear 202 omitted for simplicity. The sun gear 202, however, extends circumferentially about the longitudinal centerline axis 12 such that the forward sun gear 216, the aft sun gear 218, the forward support member 238, the aft support member 240, and the input shaft coupling member 242 are each annular member. Accordingly, though a single fastening device 244 is shown and a single opening in each of the first portions 246, 250, and 254 are described, a plurality of fastening devices 244 may be provided in a circumferentially spaced manner about the longitudinal centerline axis 12 to secure the sun gear 202 to the input shaft 210.

Figure 3A:
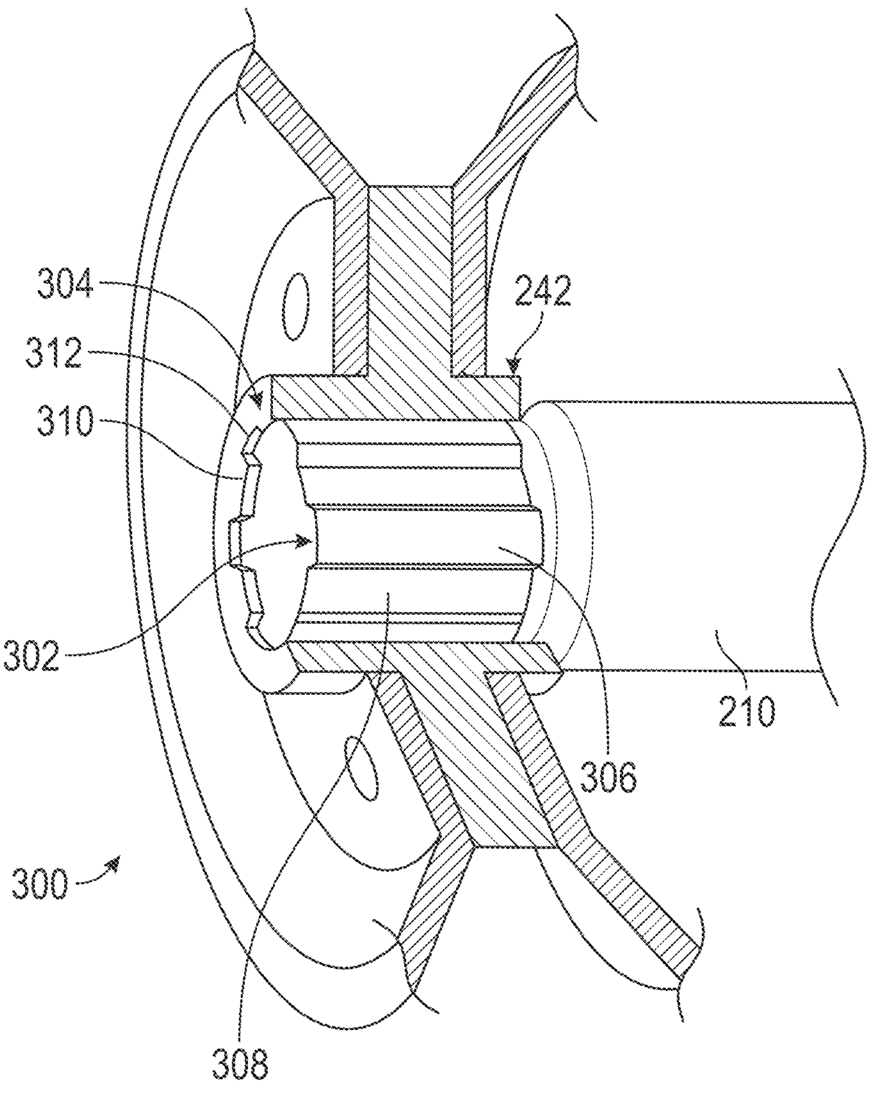
FIG. 3A illustrates a partial cross-sectional schematic view of a working spline connection for a connection device for coupling a sun gear of the gearbox assembly of FIG. 2 to an input shaft, according to the present disclosure.

FIG. 3A illustrates a partial cross-sectional schematic view of an exemplary spline connection 300 that may be employed to couple the input shaft coupling member 242 to the input shaft 210. The spline connection 300 may be a working spline. The spline connection 300 includes a first portion 302 on a radially outer surface of the input shaft 210 that mates with a second portion 304 on a radially inner surface of the input shaft coupling member 242. The first portion 302 includes a plurality of first portion protrusions 306 and a plurality of first portion slots 308 and the second portion 304 includes a plurality of second portion protrusions 310 and a plurality of second portion slots 312. The plurality of first portion protrusions 306 are received within and mate with the plurality of second portion slots 312 and the plurality of second portion protrusions 310 are received within and mate with the plurality of first portion slots 308. In this manner, the input shaft coupling member 242 (and thus the connection device 236 and the sun gear 202) may axially move with respect to the input shaft 210 while remaining rotationally coupled thereto. Although a plurality of slots and protrusions are depicted, more or fewer than shown may be provided. In one example, a single protrusion on one of the input shaft 210 or the input shaft coupling member 242 may be provided and a single slot in the other of the input shaft 210 or the input shaft coupling member 242 may be provided. The spline connection 300 is not limited to the particular structure, shape, and dimensions illustrated in FIG. 3A and other structure, shape, and dimensions are contemplated that allow for rotational coupling between the input shaft 210 and the sun gear 202.

Figure 3B:
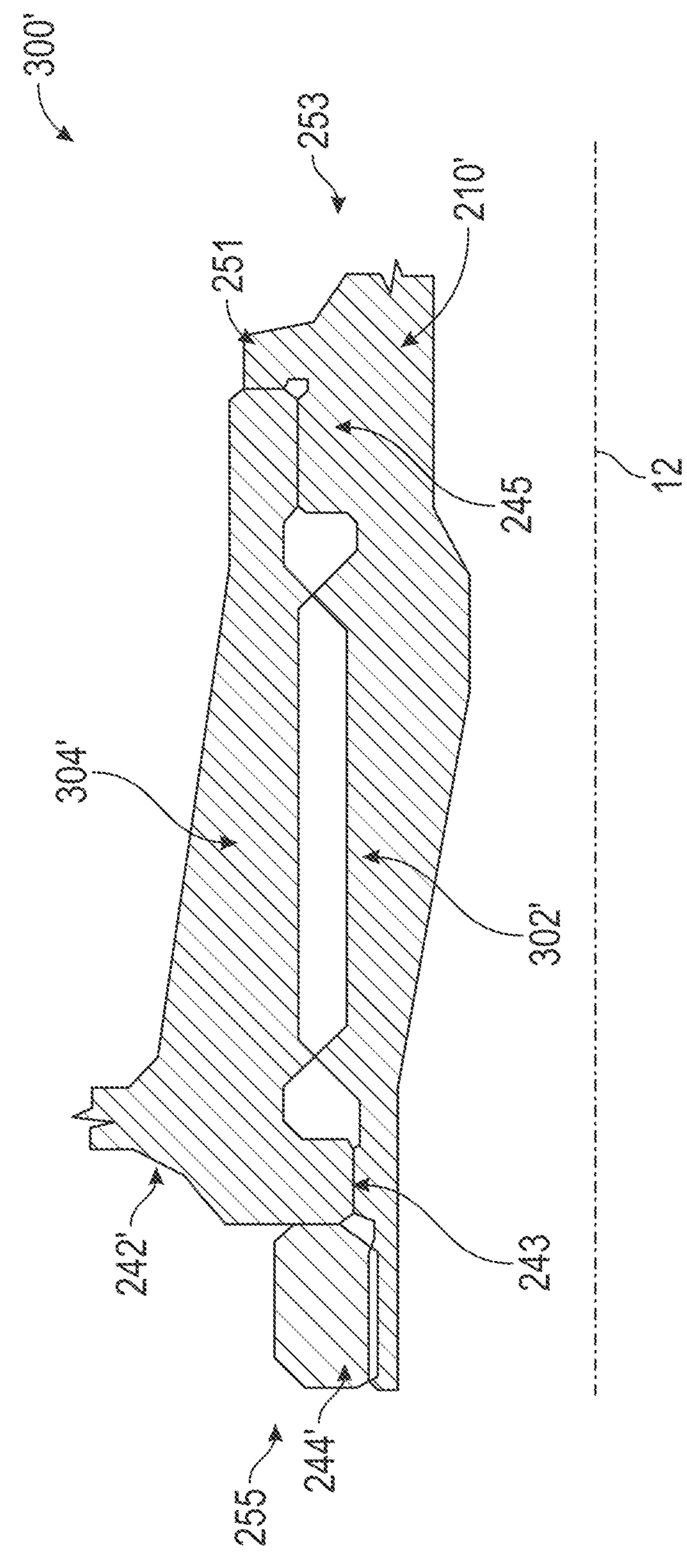
FIG. 3B illustrates a partial cross-sectional schematic view of a fixed spline connection for a connection device for coupling a sun gear of the gearbox assembly of FIG. 2 to an input shaft, according to the present disclosure.

FIG. 3B illustrates a partial cross-sectional schematic view, taken along the longitudinal centerline axis 12, of another exemplary spline connection 300' that may be employed to couple an input shaft coupling member 242' to an input shaft 210'. The spline connection 300' may be a fixed spline. The spline connection 300' includes a male spline 302' on a radially outer surface of the input shaft 210' that mates with a female spline 304' on a radially inner surface of the input shaft coupling member 242'. A first press fit 243 may be located at a forward end 253 between the input shaft 210' and the input shaft coupling member 242'. A second press fit 245 may be located at an aft end 255 between the input shaft 210' and the input shaft coupling member 242'. The input shaft coupling member 242' may abut and be adjacent to an aft shoulder 251 of the input shaft 210' that limits the axial location of the input shaft coupling member 242'. A fastening device 244' is secured to the input shaft 210' at the forward end. Therefore, the aft shoulder 251, the fastening device 244', the first press fit 243, and the second press fit 245' maintain the input shaft coupling member 242' and the input shaft 210' at a predetermined axial relationship. The male spline 302' and the female spline 304' enable transfer of rotation from the input shaft 210' to the input shaft coupling member 242' and thus to the gears, as described previously with respect to FIG. 2.

Figure 4:
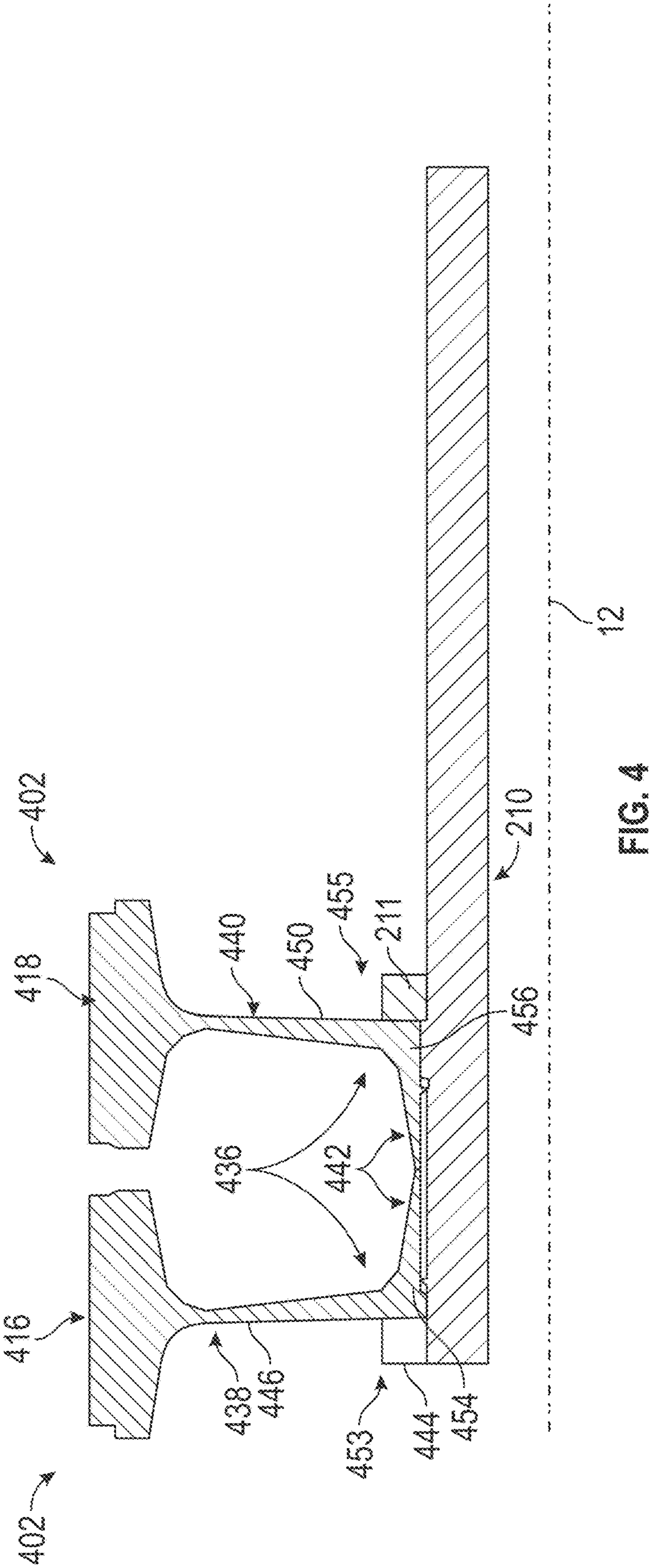
FIG. 4 illustrates a schematic cross-sectional view of a gearbox assembly for a turbine engine, taken along a longitudinal centerline axis of the gearbox assembly, according to the present disclosure.

FIG. 4 illustrates a partial cross-sectional view, taken along the longitudinal centerline axis 12, of an exemplary sun gear 402 that may be used with the gearbox assembly 200 of FIG. 2 in place of the sun gear 202. Accordingly, only the features that are different between the sun gear 202 and the sun gear 402 are described. All other features are understood to be the same as or substantially the same as those described with respect to the sun gear 202.

The sun gear 402 is a split sun gear 402 having a forward sun gear 416 and an aft sun gear 418, which are substantially the same as the forward sun gear 216 and the aft sun gear 218, with the following differences. As with the sun gear 202, the sun gear 402 is coupled to the input shaft 210 with a connection device 436. The connection device 436 couples each of the forward sun gear 416 and the aft sun gear 418 to the input shaft 210, but does not couple the forward sun gear 416 to the aft sun gear 418. The connection device 436 includes a forward support member 438, an aft support member 440, an input shaft coupling member 442, and a fastening device 444.

The forward support member 438 includes a first portion 446 that extends in the radial direction between the input shaft coupling member 442 and the forward sun gear 416. The aft support member 440 includes a first portion 450 that extends in the radial direction between the input shaft coupling member 442 and the aft sun gear 418.

The input shaft coupling member 442 includes a first portion 454 and a second portion 456 that each extends in an axial direction parallel to the input shaft 210. The first portion 454 rotationally couples the forward support member 438 and, thus, the forward sun gear 416 to the input shaft 210 and the second portion 456 couples the aft support member 440 and, thus, the aft sun gear 418 to the input shaft 210. The first portion 454 is integral with, or connected to, or coupled to the forward support member 438 and the second portion 456 is integral with, or connected to, or coupled to the aft support member 440.

Both the first portion 254 and the second portion 256 are rotationally coupled to the input shaft 210 such that rotation of the input shaft 210 causes rotation of the sun gear 402, in a manner that may be the same as, or similar to the manner described with respect to FIGS. 2 and 3A to 3B. The forward fastening device 444 extends at an axially forward end 453 of the forward sun gear 416 to prevent axial movement of the sun gear 402 with respect to the input shaft 210 in the forward direction. A shoulder 211 of the input shaft 210 is located at an axially aft end 455 of the aft sun gear 418 to prevent axial movement of the sun gear 402 with respect to the input shaft 210 in the aft direction. Thus, the fastening device 444 is secured such that the forward support member 438, the aft support member 440, and the input shaft coupling member 442 are axially fixed to the input shaft 210. In this manner, the forward sun gear 416 and the aft sun gear 418 are rotationally coupled to the input shaft 210 by way of the connection device 436. The fastening device 444 may be a plurality of fastening devices circumferentially spaced about the longitudinal centerline axis 12 (FIG. 1) or may be a single annular fastening device extending circumferentially about the longitudinal centerline axis 12. As described herein, the fastening device 444 may be a bolt, screw, weld, anchor, river, or other mechanical fastener.

The illustration of FIG. 4 is a cross-sectional view taken along the longitudinal centerline axis 12 of the turbine engine 10 of FIG. 1, with half of the sun gear 402 omitted for simplicity. The sun gear 402, however, extends circumferentially about the longitudinal centerline axis 12 such that the forward sun gear 416, the aft sun gear 418, the forward support member 438, the aft support member 440, and the input shaft coupling member 442 are each annular members.

Figure 5A:
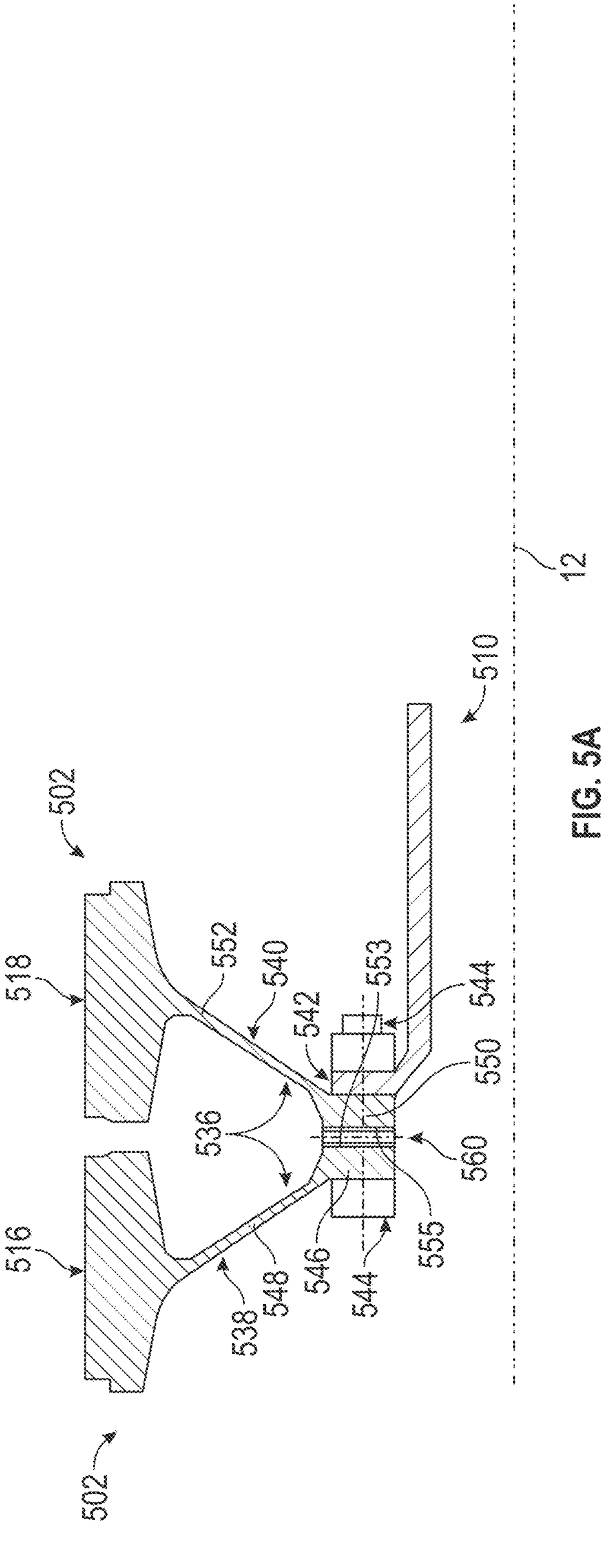
FIG. 5A illustrates a schematic cross-sectional view of a gearbox assembly for a turbine engine, taken along a longitudinal centerline axis of the gearbox assembly, according to the present disclosure.

FIG. 5A illustrates a partial cross-sectional view, taken along the longitudinal centerline axis 12, of an exemplary sun gear 502 that may be used with the gearbox assembly 200 of FIG. 2 in place of the sun gear 202. Accordingly, only the features that are different between the sun gear 202 and the sun gear 502 are described. All other features are understood to be the same as or substantially the same as those described with respect to the sun gear 202.

The sun gear 502 is a split sun gear 502 having a forward sun gear 516 and an aft sun gear 518, which are substantially the same as the forward sun gear 216 and the aft sun gear 218, with the following differences. As with the sun gear 202, the sun gear 502 is coupled to an input shaft 510 with a connection device 536. The connection device 536 couples the two separate components (e.g., the forward sun gear 516 and the aft sun gear 518) together and couples the sun gear 502 to the input shaft 510. The connection device 536 includes a forward support member 538, an aft support member 540, an input shaft coupling member 542, and a fastening device 544.

The forward support member 538 includes a first portion 546 and a second portion 548. The first portion 546 extends in the radial direction and includes an opening therethrough (not visible) for receiving the fastening device 544. The second portion 548 extends at an angle between the first portion 546 and the forward sun gear 516.

The aft support member 540 includes a first portion 550 and a second portion 552. The first portion 550 extends in the radial direction and includes an opening therethrough (not visible) for receiving the fastening device 544. The second portion 552 extends at an angle between the first portion 550 and the aft sun gear 518. The first portion 550 of the aft sun gear 518 is rotationally coupled to first portion 546 of the forward sun gear 516 with a coupling 560 such that rotation of the input shaft 510 causes rotation of the first portion 550, which causes rotation of the first portion 546, and, therefore, rotation of the sun gear 502. In the example of FIG. 5A, the coupling 560 is a curvic coupling, such as described in more detail with respect to FIG. 6.

The input shaft coupling member 542 extends in the radial direction on an aft side of and parallel to the first portion 550 of the aft support member 540. The input shaft coupling member 542 includes an opening therethrough (not visible) for receiving the fastening device 544. The input shaft coupling member 542 may extend directly from the input shaft 510. In some examples, the input shaft coupling member 542 is formed unitarily with the input shaft 510. In some examples, the input shaft coupling member 542 is coupled to the input shaft 510. The input shaft coupling member 542 is rotationally coupled to first portion 550 of the aft sun gear 518 such that rotation of the input shaft 510 causes rotation of the first portion 550 and, therefore, rotation of the sun gear 502. In the example of FIG. 5A, the first portion 550 is rotationally coupled to the input shaft coupling member 542 through the connection of the fastening device 544.

The fastening device 544 extends through respective openings in the first portion 546 of the forward support member 538, the first portion 550 of the aft support member 540, and the input shaft coupling member 542. The fastening device 544 is secured within the openings such that the forward support member 538, the aft support member 540, and the input shaft coupling member 542 are fixedly attached together. In this manner, the forward sun gear 516 and the aft sun gear 518 are rotationally coupled to the input shaft 510 by way of the connection device 536. Although the input shaft coupling member 542 is illustrated coupled to an axially aft side of the aft support member 540, other locations are contemplated, such as, for example, an axially forward side of the aft support member 540, an axially aft side of the forward support member 538, or an axially forward side of the forward support member 538.

The illustration of FIG. 5A is a cross-sectional view taken along the longitudinal centerline axis 12 of the turbine engine 10 of FIG. 1, with half of the sun gear 502 omitted for simplicity. The sun gear 502, however, extends circumferentially about the longitudinal centerline axis 12 such that the forward sun gear 516, the aft sun gear 518, the forward support member 538, the aft support member 540, and the input shaft coupling member 542 are each annular members. Accordingly, although a single fastening device 544 is shown and a single opening in each of the first portions 546, 550, and the input shaft coupling member 542 are described, a plurality of openings may be provided in a circumferentially spaced manner about the longitudinal centerline axis 12 to secure the sun gear 502 to the input shaft 510.

Figure 5B:
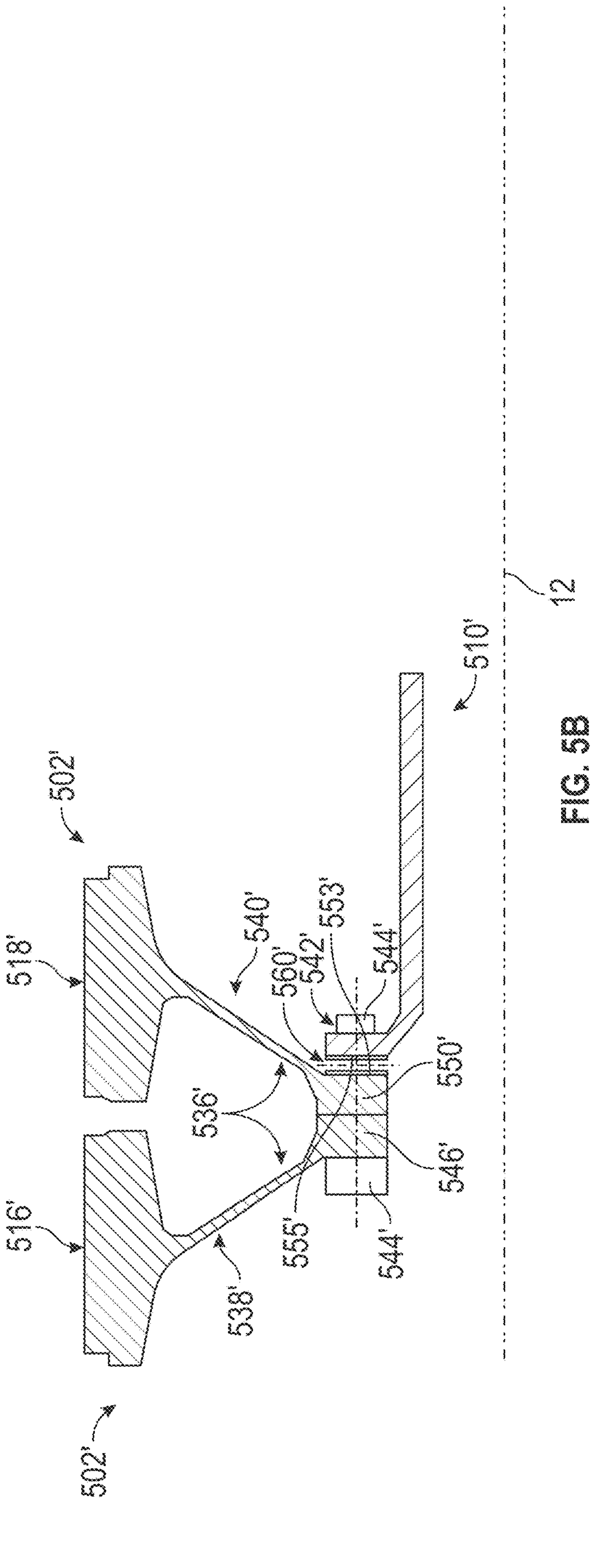
FIG. 5B illustrates a schematic cross-sectional view of a gearbox assembly for a turbine engine, taken along a longitudinal centerline axis of the gearbox assembly, according to the present disclosure.

FIG. 5B illustrates a partial cross-sectional view of an exemplary sun gear 502' that may be used with the gearbox assembly 200 of FIG. 2 in place of the sun gear 202. The sun gear 502' is similar to the sun gear 502 described with respect to FIG. 5A except for the location of the curvic coupling. Accordingly, only the features that are different between the sun gear 502 and the sun gear 502' are described. All other features are understood to be the same as or substantially the same as those described with respect to the sun gear 502.

The sun gear 502' is a split sun gear 502 having a forward sun gear 516' and an aft sun gear 518'. The sun gear 502' is coupled to an input shaft 510' with a connection device 536'. The connection device 536' couples the two separate components (e.g., the forward sun gear 516' and the aft sun gear 518') together and couples the sun gear 502' to the input shaft 510'. The connection device 536' includes a forward support member 538', an aft support member 540', an input shaft coupling member 542', and a fastening device 544'.

In FIG. 5A, the forward sun gear 516 is coupled to the aft sun gear 518 with the coupling 560 between an aft surface 553 of the first portion 546 and a forward surface 555 of the first portion 550. In FIG. 5B, however, an aft surface of the first portion 546' simply abuts a forward surface of the first portion 550' with no coupling 560 therebetween. Instead, a coupling 560' is provided between an aft surface 553' of the first portion 550' and a forward surface 555' of the input shaft coupling member 542'. The coupling 560' may be a curvic coupling such as described with respect to FIG. 6. Therefore, rotation of the input shaft 510' causes rotation of the sun gear 502' as described previously.

Figure 6:
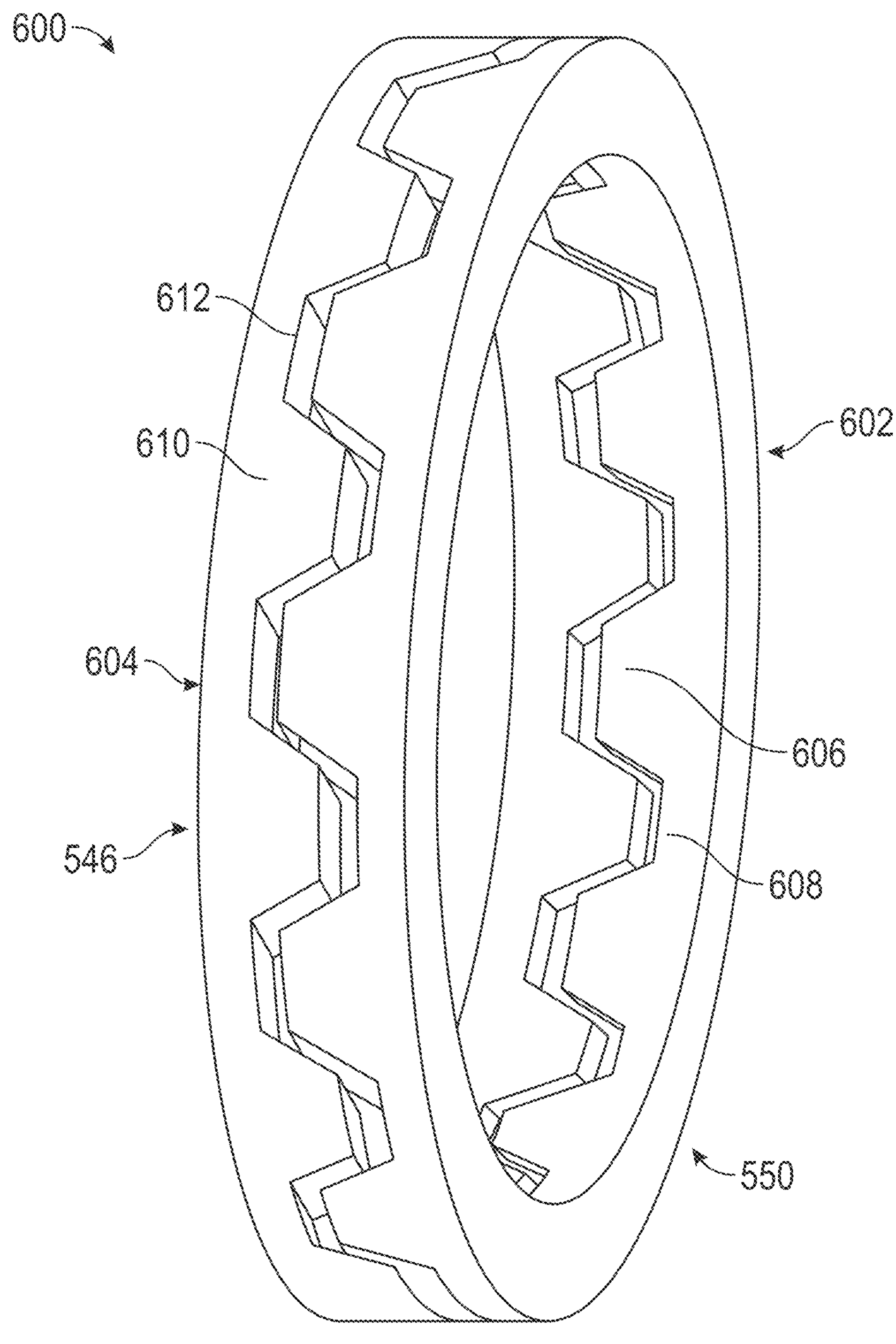
FIG. 6 illustrates a partial schematic view of a curvic connection for a connection device for coupling a sun gear of the gearbox assembly of FIG. 5A and FIG. 5B to an input shaft, according to the present disclosure.

FIG. 6 illustrates a partial view of an exemplary curvic connection 600 that may be employed to couple the first portion 546 of the forward support member 538 and the first portion 550 of the aft support member 540 (FIG. 5A). The first portion 546 and the first portion 550 are illustrated simply as cylinders in FIG. 6 solely to facilitate understanding of the curvic connection 600. The first portion 546 and the first portion 550 are arranged, however, as shown and described with respect to FIG. 5A. Likewise, when the curvic connection 600 is employed in the sun gear 502' of FIG. 5B, the first portion 546 shown in FIG. 6 may be the first portion 550' of FIG. 5B and the first portion 550 shown in FIG. 6 may be the input shaft coupling member 542' shown in FIG. 5B.

The curvic connection 600 of FIG. 6 operates the same in FIGS. 5A and 5B, only the location of the coupling is different. Therefore, the following description refers to FIG. 5A only for simplicity, but similar arrangement is understood to be present between the first portion 550' and the input shaft coupling member 542'. The curvic connection 600 includes a first portion 602 on an axial surface (in the embodiment of FIG. 5A, an axially forward facing surface) of the first portion 550 and a second portion 604 on an axial surface (in the embodiment of FIG. 5A, an axially aft facing surface) of the first portion 546. The first portion 602 includes a plurality of first portion protrusions 606 and a plurality of first portion slots 608, and the second portion 604 includes a plurality of second portion protrusions 610 and a plurality of second portion slots 612. The plurality of first portion protrusions 606 are received within and mate with the plurality of second portion slots 612 and the plurality of second portion protrusions 610 are received within and mate with the plurality of first portion slots 608. Although a plurality of slots and protrusions are depicted, more or fewer than shown may be provided. The curvic connection 600 is not limited to the particular structure, shape, and dimensions illustrated in FIG. 6. Rather, other structures, shapes, and dimensions are contemplated that allow for rotational coupling between the input shaft 510 and the sun gear 502.

Figure 7:
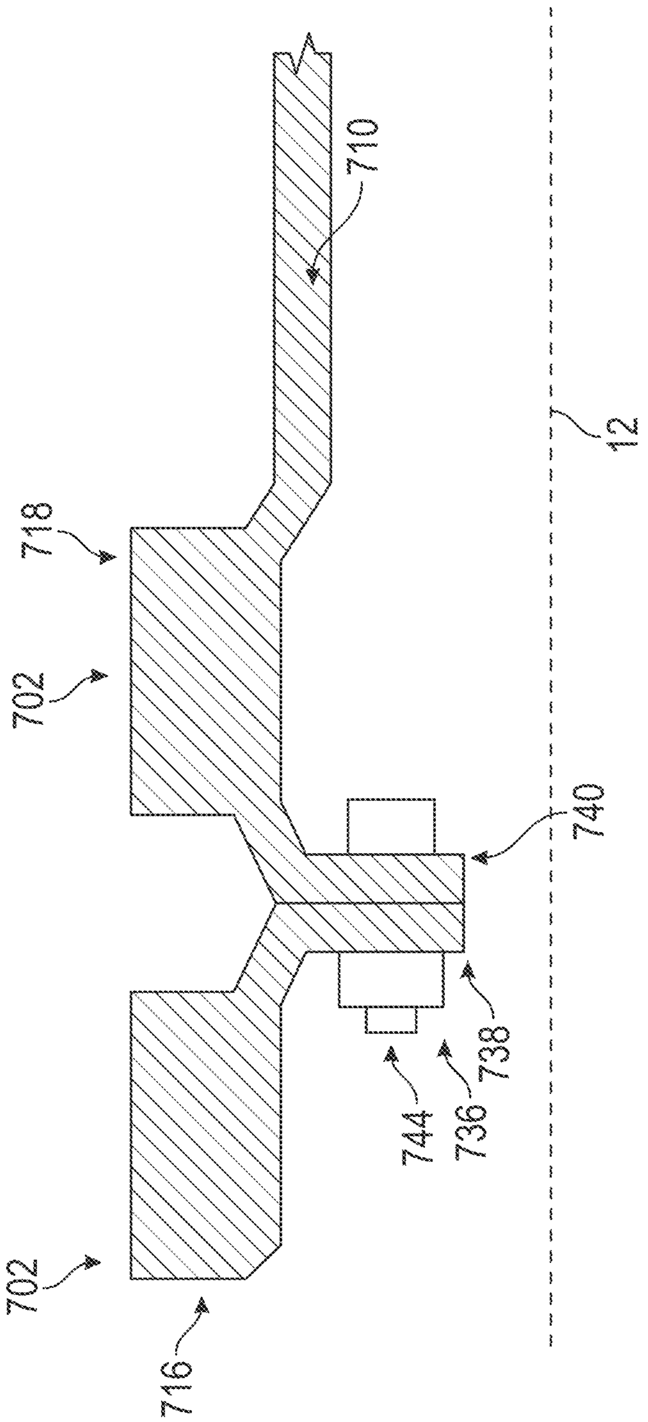
FIG. 7 illustrates a schematic cross-sectional view of a gearbox assembly for a turbine engine, taken along a longitudinal centerline axis of the gearbox assembly, according to the present disclosure.

FIG. 7 illustrates a partial cross-sectional view, taken along the longitudinal centerline axis 12, of an exemplary sun gear 702 that may be used with the gearbox assembly 200 of FIG. 2 in place of the sun gear 202. Accordingly, only the features that are different between the sun gear 202 and the sun gear 702 are described. All other features are understood to be the same as or substantially the same as those described with respect to the sun gear 202. The sun gear 702 is a split sun gear 702.

The sun gear 702 includes a forward sun gear 716 and an aft sun gear 718. The aft sun gear 718 is formed integrally and unitarily with an input shaft 710. Thus, rotation of the input shaft 710 rotates the aft sun gear 718. The forward sun gear 716 is coupled to the aft sun gear 718 with a connection device 736. The connection device 736 includes a forward support member 738 and an aft support member 740. The forward support member 738 and the aft support member 740 are coupled together with a fastening device 744. Thus, rotation of the aft sun gear 718 (due to rotation of the integrally formed input shaft 710) rotates the forward sun gear 716 due to the connection device 736.

Figure 8:
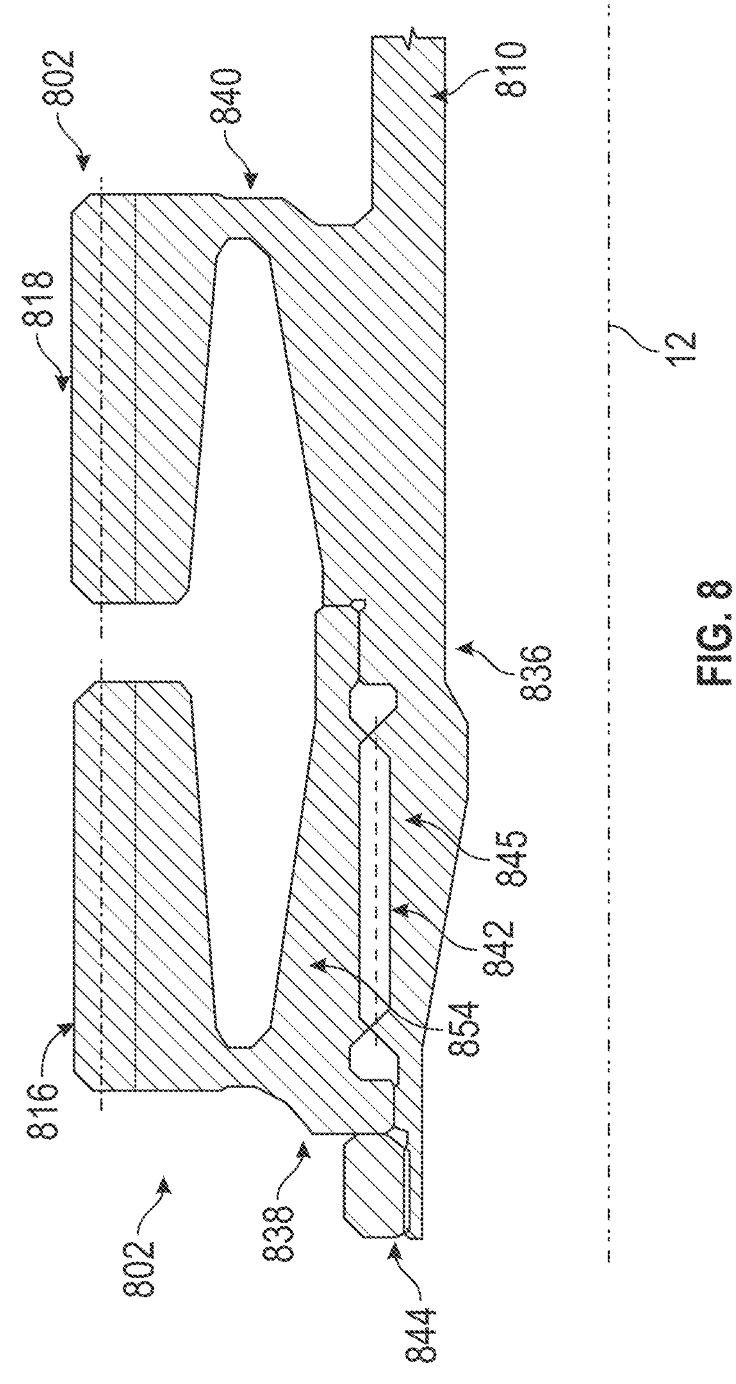
FIG. 8 illustrates a schematic cross-sectional view of a gearbox assembly for a turbine engine, taken along a longitudinal centerline axis of the gearbox assembly, according to the present disclosure.

FIG. 8 illustrates a partial cross-sectional view of an exemplary sun gear 802 that may be used with the gearbox assembly 200 of FIG. 2 in place of the sun gear 202. Accordingly, only the features that are different between the sun gear 202 and the sun gear 802 are described. All other features are understood to be the same as or substantially the same as those described with respect to the sun gear 202. The sun gear 802 is a split sun gear 802.

The sun gear 802 includes a forward sun gear 816 and an aft sun gear 818. The aft sun gear 818 is formed integrally and unitarily with an input shaft 810. An aft support member 840 supports the aft sun gear 818 on the input shaft 810. Thus, rotation of the input shaft 810 rotates the aft sun gear 818. The input shaft 810 includes an input shaft coupling member 842. The forward sun gear 816 is coupled to the input shaft coupling member 842 with a connection device 836. The connection device 836 includes a male spline 845 on the input shaft coupling member 842 and female splines 854 on the forward sun gear 816 and is thus a fixed spline as in FIG. 3B. The connection device 836 allows rotational coupling between the input shaft 810 and the forward sun gear 816. A forward support member 838 supports the forward sun gear 816 with respect to the female splines 854. A fastening device 844 secures the forward sun gear 816 to the input shaft 810.

FIGS. 7 and 8 illustrate exemplary sun gears that combine various features from other embodiments. For example, FIG. 8 combines the integral aft sun gear of FIG. 7 with the fixed spline of FIG. 5B. Thus, any portion of the aforementioned embodiments may be combined with any other portion so long as the resulting combination is a split sun gear that rotates with the input shaft.

Figure 9:
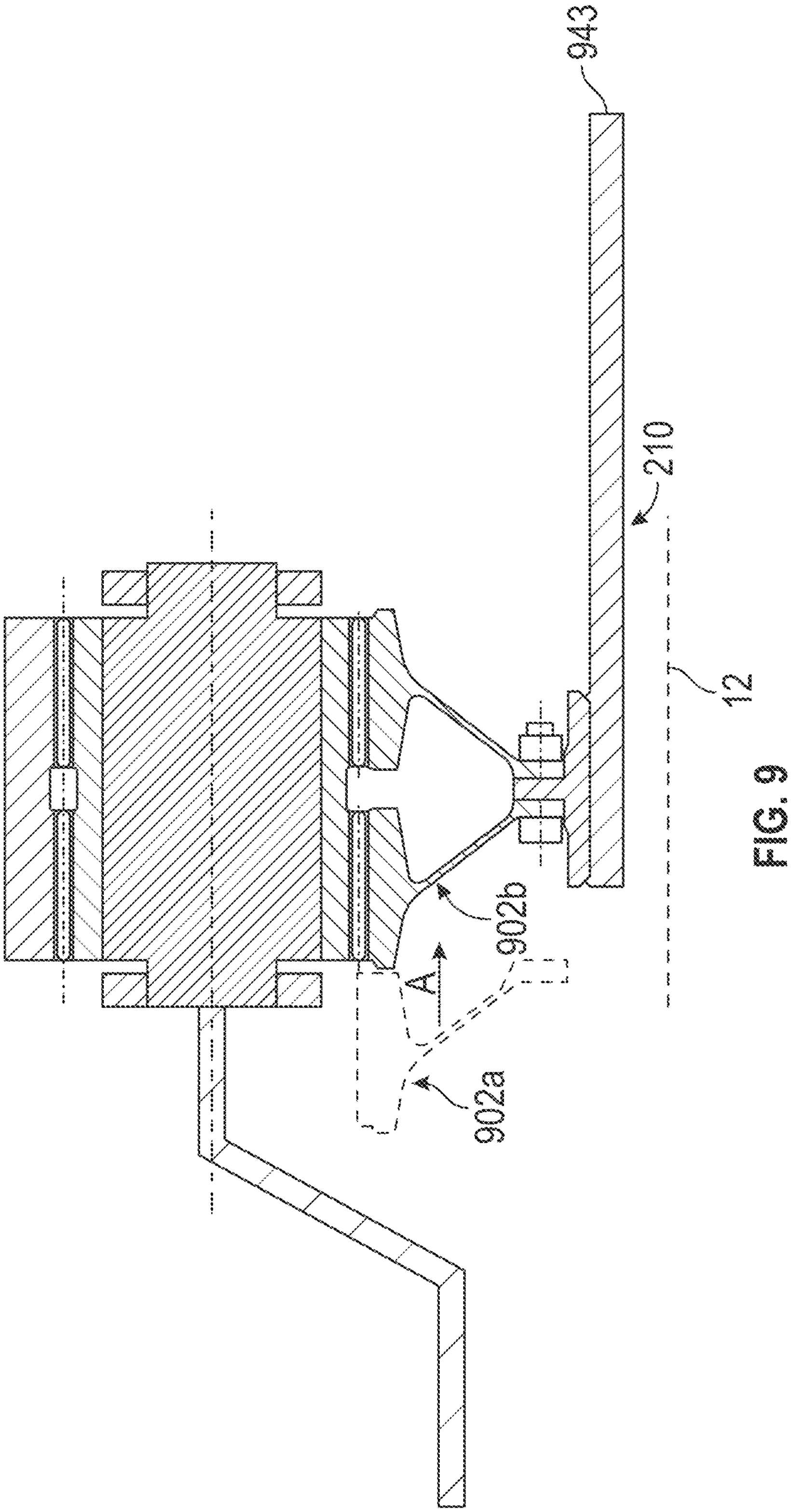
FIG. 9 illustrates a schematic cross-sectional view to show installation of a sun gear onto an input shaft, according to the present disclosure.

FIG. 9 illustrates a schematic cross-sectional view to show a portion of an installation process for a split sun gear, such as a split sun gear 202, 402, 502, 502', 702, or 802 as described herein. During installation of any of the split sun gears described herein, the aft sun gear (e.g., the aft sun gears 218, 418, 518, 518', 718, 818) is moved longitudinally in the axial direction A over a forward end 943 of the input shaft 210 (or the input shaft 510, 510', 710, or 810).

Figure 10:
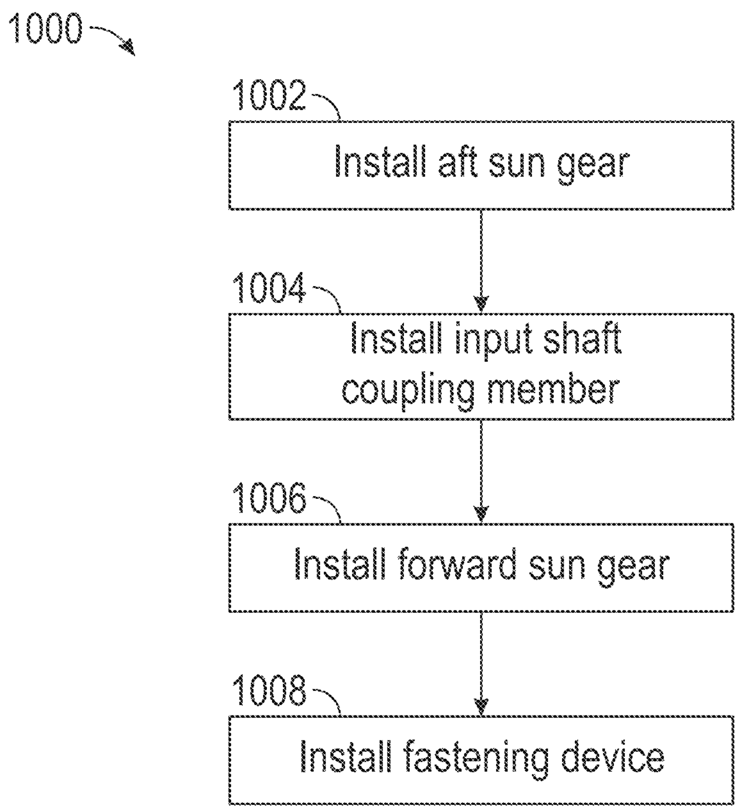
FIG. 10 illustrates a method of installing a split sun gear on an input shaft, according to the present disclosure.

In the example of the sun gear 202, and referring to FIGS. 2 and 9 and to the method 1000 of FIG. 10, the aft sun gear 218 is moved, at step 1002, longitudinally in the axial direction A over the forward end 943 of the input shaft 210. At step 1004, the input shaft coupling member 242 is moved longitudinally in the axial direction A over the forward end 943 of the input shaft 210 to a location adjacent to the aft sun gear 218. After the input shaft coupling member 242 is installed, at step 1006, the forward sun gear 216 is moved longitudinally in the axial direction A over the forward end 943 of the input shaft 210. The longitudinal motion of the components in the axial direction A is illustrated by the movement of the forward sun gear from the position 902*a* to the position 902*b* in FIG. 9. The fastening device 244 may then be secured, at step 1008, through the respective openings. In installing the sun gear 202, the protrusions and the slots of the spline connection are aligned when installing the input shaft coupling member 242 to ensure proper operation and proper rotational coupling of the input shaft 210 and the sun gear 202.

Figure 11:
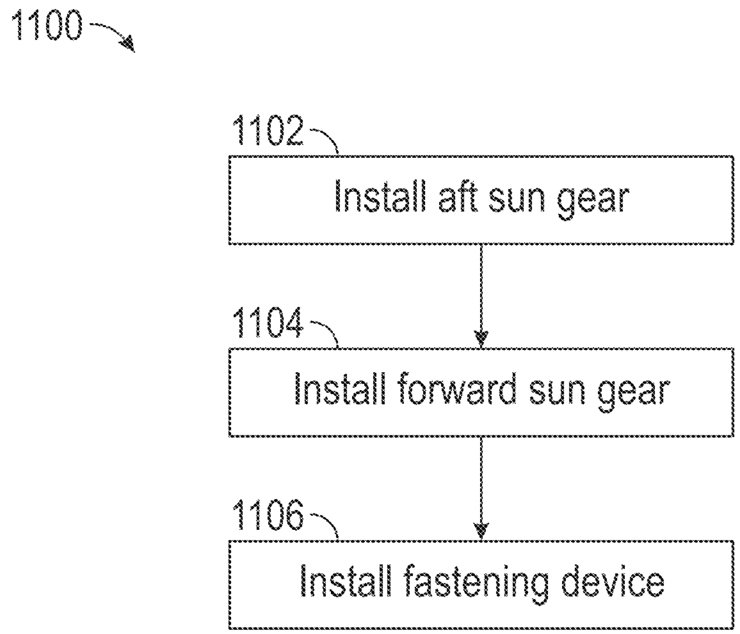
FIG. 11 illustrates a method of installing a split sun gear on an input shaft, according to the present disclosure.

Referring to FIG. 4 and the method 1100 of FIG. 11, in the example of the sun gear 402, the input shaft coupling member 442 is a part of each of the forward sun gear 416 and the aft sun gear 418. Therefore, the aft sun gear 418, including the aft portion of the input shaft coupling member 442, is moved longitudinally in the axial direction A, at step 1102, over the input shaft 210. After installation of the aft sun gear 418, at step 1104, the forward sun gear 416, along with the forward portion of the input shaft coupling member 442, is moved longitudinally in the axial direction A over the forward end 943 of the input shaft 210. The fastening device 444 may then be installed, at step 1106, at the forward end 943 of the input shaft 210 to prevent longitudinal movement of the sun gear 402 off the input shaft 210. In installing the sun gear 402, the protrusions and the slots of the spline connection are aligned when installing each of the aft sun gear 418 and the forward sun gear 416 to ensure proper operation and proper rotational coupling of the input shaft 210 and the sun gear 402.

Figure 12:
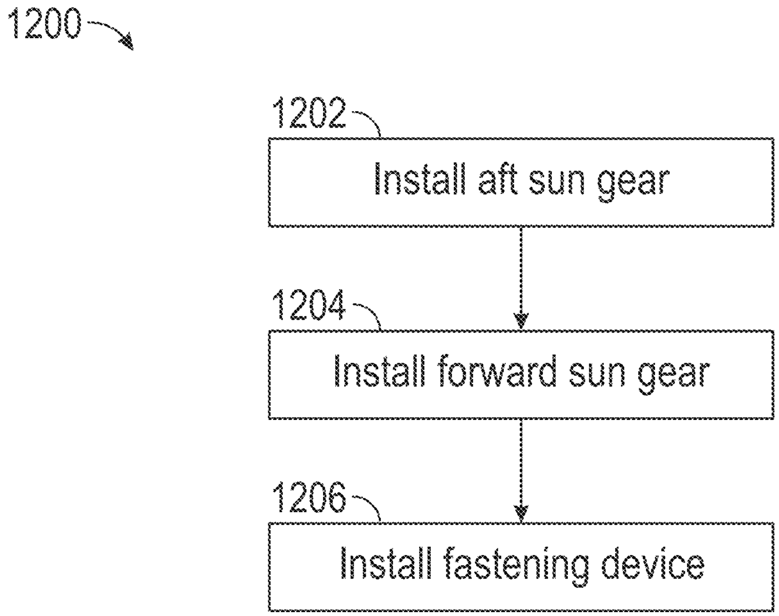
FIG. 12 illustrates a method of installing a split sun gear on an input shaft, according to the present disclosure.

Referring to FIG. 5A and the method 1200 of FIG. 12, in the example of the sun gear 502, the input shaft coupling member 542 is either previously installed on the input shaft 510 prior to installation of the aft sun gear 518, or is optionally integral and unitary with the input shaft 510 such that no installation is required. In either case, the aft sun gear 518 is aligned with an aft end of the input shaft coupling member 542 at step 1202. After the aft sun gear 518 is aligned with the input shaft 510, the forward sun gear 516 is moved longitudinally in the axial direction A, at step 1204, to align with the aft sun gear 518. The openings through the aft sun gear 518 and the forward sun gear 516 are aligned during step 1204. The fastening device 544, at step 1206, may then be secured through the respective openings. In installing the sun gear 502, the protrusions and the slots of the curvic connection are aligned when installing the forward sun gear 516 to ensure proper operation and proper rotational coupling of the input shaft 510 and the sun gear 502. Referring to FIG. 5B, in installing the sun gear 502', the only difference is that the protrusions and the slots of the curvic connection are aligned when installing the aft sun gear 518' to ensure proper operation and proper rotational coupling of the input shaft 510' and the sun gear 502'.

Figure 13:
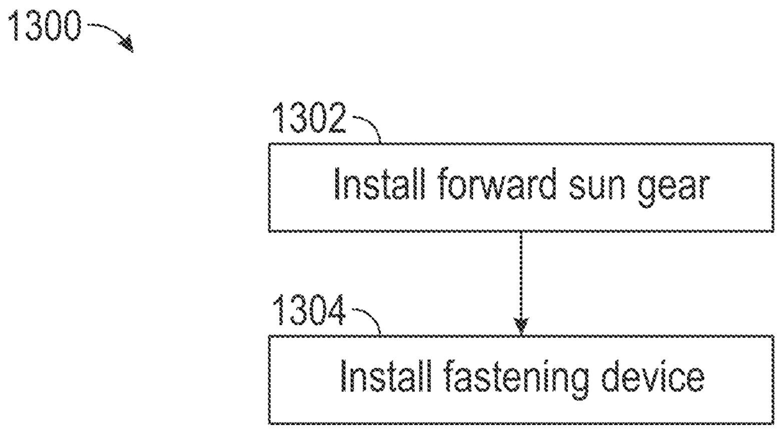
FIG. 13 illustrates a method of installing a split sun gear on an input shaft, according to the present disclosure.

Referring to FIG. 7 and the method 1300 of FIG. 13, in the example of the sun gear 702, the aft sun gear 718 is integral with the input shaft 710. Thus, to install the sun gear 702, the forward sun gear 716 is moved longitudinally in the axial direction A, at step 1302, to mate the forward support member 738 with the aft support member 740. The fastening device 744, at step 1304, may then be secured through the respective openings.

Referring to FIG. 8, in the example of the sun gear 802, the aft sun gear 818 is integral with the input shaft 810. Thus, to install the sun gear 802, the method 1300 of FIG. 13 applies. In the example of the sun gear 802, the forward sun gear 816 is moved longitudinally over the input shaft 810 in the axial direction A. The fastening device 844 may then be secured through the respective openings. In installing the sun gear 802, the protrusions and the slots of the spline connection are aligned when installing the forward sun gear 816 to ensure proper operation and proper rotational coupling of the input shaft 810 and the sun gear 802.

Figure 14:
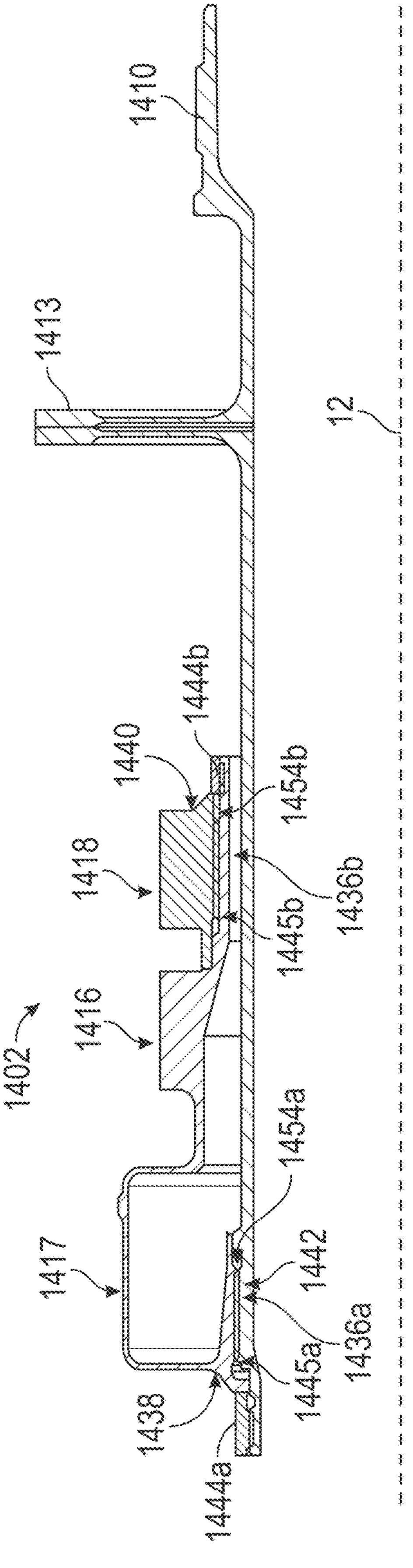
FIG. 14 illustrates a schematic, cross-sectional view of a gearbox assembly for a turbine engine, taken along a longitudinal centerline axis of the turbine engine, according to the present disclosure.

FIG. 14 illustrates a partial, cross-sectional view of a sun gear 1402 that may be used with the gearbox assembly 200 of FIG. 2 in place of the sun gear 202. Accordingly, only the features that are different between the sun gear 202 and the sun gear 1402 are described. All other features are understood to be the same as or substantially the same as those described with respect to the sun gear 202. The sun gear 1402 is coupled to an input shaft 1410 having a flex coupling 1413. The flex coupling 1413 has a stiffness (e.g., an axial stiffness, a lateral stiffness, a bending stiffness, and a torsional stiffness) and a damping coefficient (e.g., an axial damping, a lateral damping, a bending damping, and a torsional damping) that help to reduce or to prevent vibrations from propagating between the gearbox assembly 200 and the input shaft 1410.

The sun gear 1402 is a split sun gear 1402. The sun gear 1402 includes a forward sun gear 1416 and an aft sun gear 1418. The sun gear teeth are not shown in the view of FIG. 14. The input shaft 1410 includes an input shaft coupling member 1442. The forward sun gear 1416 includes a flex sun gear portion 1417. In this way, the flex sun gear portion 1417 functions similar as to the flex coupling 1413. The forward sun gear 1416 is coupled to the input shaft coupling member 1442 at the flex sun gear portion 1417 with a forward connection device 1436*a*. The forward connection device 1436*a* includes a forward male spline 1445*a* on the input shaft coupling member 1442 and forward female splines 1454*a* on the flex sun gear portion 1417 of the forward sun gear 1416 and is thus a fixed spline as in FIG. 3B. The forward connection device 1436*a* allows rotational coupling between the input shaft 1410 and the forward sun gear 1416. A forward support member 1438 supports the forward sun gear 1416 with respect to the forward female splines 1454*a*. A forward fastening device 1444*a* secures the forward sun gear 1416 to the input shaft 1410.

The aft sun gear 1418 is coupled to the forward sun gear 1416 with an aft connection device 1436*b*. The aft connection device 1436*b* includes an aft male spline 1445*b* on the forward sun gear 1416 and aft female splines 1454*b* on the aft sun gear 1418 and is thus a fixed spline as in FIG. 3B. The aft connection device 1436*b* allows rotational coupling between the forward sun gear 1416 and the aft sun gear 1418. An aft support member 1440 supports the aft sun gear 1418 with respect to the aft female splines 1454*b*. An aft fastening device 1444*b* secures the aft sun gear 1418 to the forward sun gear 1416.

The illustration of FIG. 14 is a cross-sectional view taken along the longitudinal centerline axis 12 of the turbine engine 10 of FIG. 1, with half of the sun gear 1402 omitted for simplicity. The sun gear 1402, however, extends circumferentially about the longitudinal centerline axis 12 such that the forward sun gear 1416, the aft sun gear 1418, the forward support member 1438, the aft support member 1440, and the input shaft coupling member 1442 are each annular members.

Further aspects are provided by the subject matter of the following clauses.

A turbine engine comprises a turbo-engine coupled to an input shaft, a fan coupled to an output shaft, and a gearbox assembly, wherein a torque is transferrable from the input shaft to the output shaft through the gearbox assembly. The gearbox assembly comprises a split sun gear rotationally coupled to the input shaft, a plurality of planet gears located radially outward of, and intermeshing with, the split sun gear, and a single piece ring gear located radially outward of, and intermeshing with, the plurality of planet gears. The split sun gear having a forward sun gear and an aft sun gear separate from the forward sun gear, wherein the forward sun gear and the aft sun gear are each rotationally coupled to the input shaft.

The turbine engine of the preceding clause, the wherein the split sun gear is a double helical gear.

The turbine engine of any preceding clause, the gearbox assembly further comprising a connection device for rotationally coupling the split sun gear to the input shaft.

The turbine engine of any preceding clause, the connection device comprising a forward support member, an aft support member, and an input shaft coupling member.

The turbine engine of any preceding clause, wherein the forward support member extends between the input shaft and the forward sun gear, the aft support member extends between the input shaft and the aft sun gear, and the input shaft coupling member rotationally couples the forward sun gear and the aft sun gear to the input shaft.

The turbine engine of any preceding clause, wherein the input shaft coupling member is rotationally coupled to the input shaft with a spline connection.

The turbine engine of any preceding clause, wherein a first portion of the input shaft coupling member extends from the forward support member and a second portion of the input shaft coupling member extends from the aft support member.

The turbine engine of any preceding clause, wherein the first portion and the second portion extend axially and parallel with a longitudinal centerline axis of the input shaft.

The turbine engine of any preceding clause, wherein the first portion is integral with the forward support member and the second portion is integral with the aft support member.

The turbine engine of any preceding clause, further comprising a fastening device coupled to a forward side of the forward sun gear to secure the split sun gear in an axial direction on the input shaft.

The turbine engine of any preceding clause, wherein the first portion and the second portion each comprises a spline connection with the input shaft.

The turbine engine of any preceding clause, wherein the forward support member is rotationally coupled to the aft support member with a curvic connection.

The turbine engine of any preceding clause, wherein an axially forward facing surface of the input shaft coupling member comprises a first portion of the curvic connection and an axially aft facing surface of the aft support member comprises a second portion of the curvic connection, the first portion of the curvic connection and the second portion of the curvic connection mating to form a rotational coupling between the input shaft coupling member and the aft support member such that rotation of the input shaft causes rotation of the input shaft coupling member and thus causes rotation of the split sun gear.

The turbine engine of any preceding clause, wherein the aft support member is rotationally coupled to the input shaft coupling member with a curvic coupling.

The turbine engine of any preceding clause, wherein the curvic connection comprises a plurality of protrusions and a plurality of slots on the axially forward-facing surface of the input shaft coupling member that mate with a respective plurality of slots and a plurality of protrusions on the axially aft facing surface of the aft support member.

The turbine engine of any preceding clause, wherein each of the forward support member, the aft support member, and the input shaft coupling member comprises a first portion and a second portion.

The turbine engine of any preceding clause, further comprising a fastening device extending through the first portion of each of the forward support member, the aft support member, and the input shaft coupling member to secure the forward sun gear and the aft sun gear in an axial direction with respect to the input shaft.

The turbine engine of any preceding clause, wherein the first portion of the forward support member extends in a radial direction and the second portion of the forward support member extends at an angle between the first portion of the forward support member and the forward sun gear, the first portion of the aft support member extends in the radial direction and the second portion of the aft support member extends at an angle between the first portion of the aft support member and the aft sun gear, and the first portion of the input shaft coupling member extends in the radial direction and the second portion of the input shaft coupling member extends in an axial direction parallel to a longitudinal centerline axis of the turbine engine.

The turbine engine of any preceding clause, wherein the first portion of each of the forward support member, the aft support member, and the input shaft coupling member extends parallel to each other.

The turbine engine of any preceding clause, wherein a radially inner surface of the second portion of the input shaft coupling member comprises a first portion of a spline connection and a radially outer surface of the input shaft comprises a second portion of the spline connection, the first portion of the spline connection and the second portion of the spline connection mating to form a rotational coupling between the input shaft and the input shaft coupling member such that rotation of the input shaft causes rotation of the input shaft coupling member and thus causes rotation of the split sun gear.

The turbine engine of any preceding clause, wherein the spline connection comprises a plurality of protrusions and a plurality of slots on the radially inner surface of the second portion of the input shaft coupling member that mate with a respective plurality of slots and a plurality of protrusions on the radially outer surface of the input shaft.

The turbine engine of any preceding clause, wherein the gearbox assembly comprises a planet carrier for constraining the plurality of planet gears, the planet carrier coupled to the output shaft.

The turbine engine of any preceding clause, the turbine engine further comprising a low-pressure shaft coupled to the output shaft and the fan via the gearbox assembly, wherein the low-pressure shaft is drivingly coupled to the input shaft such that rotation of the low-pressure shaft rotates the input shaft.

The turbine engine of any preceding clause, further comprising a fastening device extending through each of the forward support member, the aft support member, and the input shaft coupling member to secure the forward sun gear and the aft sun gear in the axial direction.

The turbine engine of any preceding clause, wherein the spline connection is a fixed spline.

The turbine engine of any preceding clause, wherein the spline connection is a working spline.

The turbine engine of any preceding clause, wherein the forward sun gear includes a flex sun gear portion.

The turbine engine of any preceding clause, wherein the forward sun gear is coupled to the shaft coupling member at the flex sun gear portion with a forward connection device.

The turbine engine of any preceding clause, wherein the forward connection device includes a forward male spline on the shaft coupling member and a forward female spline on the flex sun gear portion.

The turbine engine of any preceding clause, wherein the aft sun gear is coupled to the forward sun gear with an aft connection device.

The turbine engine of any preceding clause, wherein the aft connection device includes an aft male spline on the forward sun gear and an aft female spline on the aft sun gear.

A gearbox assembly comprising a split sun gear, a single piece ring gear, and a plurality of planet gears. The split sun gear having a forward sun gear and an aft sun gear separate from the forward sun gear, wherein the forward sun gear and the aft sun gear are each rotationally coupled to the input shaft.

The gearbox assembly of the preceding clause, wherein the split sun gear is rotationally coupled to a shaft of a turbine engine, the plurality of planet gears are located radially outward of, and intermeshing with, the split sun gear, and the single piece ring gear is located radially outward of, and intermeshing with, the plurality of planet gears.

The gearbox assembly of any preceding clause, the wherein the split sun gear is a double helical gear.

The gearbox assembly of any preceding clause, further comprising a connection device for rotationally coupling the split sun gear to the shaft.

The gearbox assembly of any preceding clause, the connection device comprising a forward support member, an aft support member, and an input shaft coupling member.

The gearbox assembly of any preceding clause, wherein the forward support member extends between the shaft and the forward sun gear, the aft support member extends between the shaft and the aft sun gear, and the shaft coupling member rotationally couples the forward sun gear and the aft sun gear to the shaft.

The gearbox assembly of any preceding clause, wherein the input shaft coupling member is rotationally coupled to the shaft with a spline connection.

The gearbox assembly of any preceding clause, wherein a first portion of the input shaft coupling member extends from the forward support member and a second portion of the input shaft coupling member extends from the aft support member.

The gearbox assembly of any preceding clause, wherein the first portion and the second portion extend axially and parallel with a longitudinal centerline axis of the input shaft.

The gearbox assembly of any preceding clause, wherein the first portion is integral with the forward support member and the second portion is integral with the aft support member.

The gearbox assembly of any preceding clause, further comprising a fastening device coupled to a forward side of the forward sun gear to secure the split sun gear in an axial direction on the input shaft.

The turbine engine of any preceding clause, wherein the first portion and the second portion each comprises a spline connection with the input shaft.

The gearbox assembly of any preceding clause, wherein the forward support member is rotationally coupled to the aft support member with a curvic connection.

The gearbox assembly of any preceding clause, wherein an axially forward facing surface of the input shaft coupling member comprises a first portion of the curvic connection and an axially aft facing surface of the aft support member comprises a second portion of the curvic connection, the first portion of the curvic connection and the second portion of the curvic connection mating to form a rotational coupling between the input shaft coupling member and the aft support member such that rotation of the input shaft causes rotation of the input shaft coupling member and thus causes rotation of the split sun gear.

The gearbox assembly of any preceding clause, wherein the aft support member is rotationally coupled to the input shaft coupling member with a curvic coupling.

The gearbox assembly of any preceding clause, wherein the curvic connection comprises a plurality of protrusions and a plurality of slots on the axially forward-facing surface of the input shaft coupling member that mate with a respective plurality of slots and a plurality of protrusions on the axially aft facing surface of the aft support member.

The gearbox assembly of any preceding clause, wherein each of the forward support member, the aft support member, and the input shaft coupling member comprises a first portion and a second portion.

The gearbox assembly of any preceding clause, further comprising a fastening device extending through the first portion of each of the forward support member, the aft support member, and the input shaft coupling member to secure the forward sun gear and the aft sun gear in an axial direction with respect to the input shaft.

The gearbox assembly of any preceding clause, wherein the first portion of the forward support member extends in a radial direction and the second portion of the forward support member extends at an angle between the first portion of the forward support member and the forward sun gear, the first portion of the aft support member extends in the radial direction and the second portion of the aft support member extends at an angle between the first portion of the aft support member and the aft sun gear, and the first portion of the input shaft coupling member extends in the radial direction and the second portion of the input shaft coupling member extends in an axial direction parallel to a longitudinal centerline axis of the turbine engine.

The gearbox assembly of any preceding clause, wherein the first portion of each of the forward support member, the aft support member, and the input shaft coupling member extends parallel to each other.

The gearbox assembly of any preceding clause, wherein a radially inner surface of the second portion of the input shaft coupling member comprises a first portion of a spline connection and a radially outer surface of the input shaft comprises a second portion of the spline connection, the first portion of the spline connection and the second portion of the spline connection mating to form a rotational coupling between the input shaft and the input shaft coupling member such that rotation of the input shaft causes rotation of the input shaft coupling member and thus causes rotation of the split sun gear.

The gearbox assembly of any preceding clause, wherein the spline connection comprises a plurality of protrusions and a plurality of slots on the radially inner surface of the second portion of the input shaft coupling member that mate with a respective plurality of slots and a plurality of protrusions on the radially outer surface of the input shaft.

The gearbox assembly of any preceding clause, wherein the gearbox assembly comprises a planet carrier for constraining the plurality of planet gears, the planet carrier coupled to the output shaft.

The gearbox assembly of any preceding clause, the turbine engine further comprising a low-pressure shaft coupled to the output shaft and the fan via the gearbox assembly, wherein the low-pressure shaft is drivingly coupled to the input shaft such that rotation of the low-pressure shaft rotates the input shaft.

The gearbox assembly of any preceding clause, further comprising a fastening device extending through each of the forward support member, the aft support member, and the input shaft coupling member to secure the forward sun gear and the aft sun gear in the axial direction.

The gearbox assembly of any preceding clause, wherein the spline connection is a fixed spline.

The gearbox assembly of any preceding clause, wherein the spline connection is a working spline.

The gearbox assembly of any preceding clause, wherein the forward sun gear includes a flex sun gear portion.

The gearbox assembly of any preceding clause, wherein the forward sun gear is coupled to the shaft coupling member at the flex sun gear portion with a forward connection device.

The gearbox assembly of any preceding clause, wherein the forward connection device includes a forward male spline on the shaft coupling member and a forward female spline on the flex sun gear portion.

The gearbox assembly of any preceding clause, wherein the aft sun gear is coupled to the forward sun gear with an aft connection device.

The gearbox assembly of any preceding clause, wherein the aft connection device includes an aft male spline on the forward sun gear and an aft female spline on the aft sun gear.

A turbine engine comprising the gearbox assembly of any preceding clause.

A method of operating the gearbox assembly of any preceding clause.

A method of operating the turbine engine of any preceding clause.

A method of installing a split sun gear comprising installing an aft sun gear on an input shaft, installing an input shaft coupling member on the input shaft, installing a forward sun gear on the input shaft, and fastening the forward sun gear to the aft sun gear.

A method of installing a split sun gear comprising installing an aft sun gear on an input shaft, installing a forward sun gear on the input shaft, and fastening the forward sun gear to the aft sun gear.

The method of the preceding clause, wherein the aft sun gear and the forward sun gear are each integral with an input shaft coupling member.

The method of any preceding clause, wherein the aft sun gear is installed longitudinally over the input shaft.

The method of any preceding clause, wherein the aft sun gear is aligned with a forward face of the input shaft.

A method of installing a split sun gear comprising installing a forward sun gear on an input shaft and fastening the forward sun gear to an aft sun gear that is integral with the input shaft.

Although the foregoing description is directed to the preferred embodiments of the present disclosure, other variations and modifications will be apparent to those skilled in the art and may be made without departing from the disclosure. Moreover, features described in connection with one embodiment of the present disclosure may be used in conjunction with other embodiments, even if not explicitly stated above.

The invention claimed is:

1. A turbine engine comprising:

a turbo-engine coupled to an input shaft;

a fan coupled to an output shaft; and a gearbox assembly, wherein a torque is transferrable from the input shaft to the output shaft through the gearbox assembly, the gearbox assembly comprising:

a split sun gear rotationally coupled to the input shaft, the split sun gear comprising a forward sun gear and an aft sun gear separate from the forward sun gear, wherein the forward sun gear and the aft sun gear are each rotationally coupled to the input shaft;

a plurality of planet gears located radially outward of, and intermeshing with, the split sun gear;

a single piece ring gear located radially outward of, and intermeshing with, the plurality of planet gears; and a connection device for rotationally coupling the split sun gear to the input shaft, the connection device comprising a forward support member, an aft support member, and an input shaft coupling member, wherein the forward support member, the aft support member, and the input shaft coupling member are coupled together at the input shaft coupling member, wherein the forward support member and the aft support member are coupled to the input shaft coupling member radially inward of the forward sun gear and the aft sun gear.

2. The turbine engine of claim 1, wherein the split sun gear is a double helical gear.

3. The turbine engine of claim 1, wherein the aft support member is rotationally coupled to the input shaft coupling member with a curvic connection.

4. The turbine engine of claim 1, wherein the input shaft coupling member is rotationally coupled to the input shaft with a spline connection.

5. The turbine engine of claim 1, wherein the forward support member extends between the input shaft and the forward sun gear, the aft support member extends between the input shaft and the aft sun gear, and the input shaft coupling member rotationally couples the forward sun gear and the aft sun gear to the input shaft.

6. The turbine engine of claim 1, wherein the forward support member is rotationally coupled to the aft support member with a curvic connection.

7. The turbine engine of claim 6, wherein an axially forward facing surface of the input shaft coupling member comprises a first portion of the curvic connection and an axially aft facing surface of the aft support member comprises a second portion of the curvic connection, the first portion of the curvic connection and the second portion of the curvic connection mating to form a rotational coupling between the input shaft coupling member and the aft support member such that rotation of the input shaft causes rotation of the input shaft coupling member and thus causes rotation of the split sun gear.

8. The turbine engine of claim 1, wherein a first portion of the input shaft coupling member extends from the forward support member and a second portion of the input shaft coupling member extends from the aft support member.

9. The turbine engine of claim 8, wherein the first portion and the second portion extend axially and parallel with a longitudinal centerline axis of the input shaft.

10. The turbine engine of claim 8, wherein the first portion is integral with the forward support member and the second portion is integral with the aft support member.

11. The turbine engine of claim 8, further comprising a fastening device coupled to a forward side of the forward sun gear to secure the split sun gear in an axial direction on the input shaft.

12. The turbine engine of claim 8, wherein the first portion and the second portion each comprises a spline connection with the input shaft.

13. The turbine engine of claim 1, wherein each of the forward support member, the aft support member, and the input shaft coupling member comprises a first portion and a second portion.

14. The turbine engine of claim 13, further comprising a fastening device extending through the first portion of each of the forward support member, the aft support member, and the input shaft coupling member to secure the forward sun gear and the aft sun gear in an axial direction with respect to the input shaft.

15. The turbine engine of claim 13, wherein the first portion of the forward support member extends in a radial direction and the second portion of the forward support member extends at an angle between the first portion of the forward support member and the forward sun gear, the first portion of the aft support member extends in the radial direction and the second portion of the aft support member extends at an angle between the first portion of the aft support member and the aft sun gear, and the first portion of the input shaft coupling member extends in the radial direction and the second portion of the input shaft coupling member extends in an axial direction parallel to a longitudinal centerline axis of the turbine engine.

16. The turbine engine of claim 15, wherein the first portion of each of the forward support member, the aft support member, and the input shaft coupling member extends parallel to each other.

17. The turbine engine of claim 15, wherein a radially inner surface of the second portion of the input shaft coupling member comprises a first portion of a spline connection and a radially outer surface of the input shaft comprises a second portion of the spline connection, the first portion of the spline connection and the second portion of the spline connection mating to form a rotational coupling between the input shaft and the input shaft coupling member such that rotation of the input shaft causes rotation of the input shaft coupling member and thus causes rotation of the split sun gear.

18. The turbine engine of claim 17, wherein the spline connection is a fixed spline.

19. The turbine engine of claim 1, wherein the forward support member, the aft support member, and the input shaft coupling member are coaxial with each other at the input shaft coupling member.

* * * * *